US012570201B2

(12) United States Patent
Wruck et al.

(10) Patent No.: US 12,570,201 B2
(45) Date of Patent: *Mar. 10, 2026

(54) FLUID TRANSPORTATION AND DELIVERY APPARATUS

(71) Applicant: Westmor Industries, LLC, Morris, MN (US)

(72) Inventors: Abe Wruck, Hoffman, MN (US); Jeremy Kellen, Brandon, MN (US); Mike Hennen, Morris, MN (US); Milt Swenson, Morris, MN (US)

(73) Assignee: Westmor Industries, LLC, Morris, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,871

(22) Filed: Dec. 7, 2023

(65) Prior Publication Data

US 2024/0101015 A1     Mar. 28, 2024

Related U.S. Application Data

(63) Continuation of application No. 16/730,765, filed on Dec. 30, 2019, now Pat. No. 11,878,621, which is a continuation of application No. 15/479,935, filed on Apr. 5, 2017, now Pat. No. 10,519,027.

(60) Provisional application No. 62/318,639, filed on Apr. 5, 2016.

(51) Int. Cl.
| | |
|---|---|
| *B60P 3/22* | (2006.01) |
| *B67D 7/40* | (2010.01) |
| *B67D 7/84* | (2010.01) |

(52) U.S. Cl.
CPC ............. *B60P 3/225* (2013.01); *B60P 3/2215* (2013.01); *B60P 3/2245* (2013.01); *B60P 3/2265* (2013.01); *B67D 7/40* (2013.01); *B67D 7/845* (2013.01)

(58) Field of Classification Search
CPC ..... B60P 3/2245; B60P 3/2265; B60P 3/2215; F17C 2270/0171; F17C 2223/0153
See application file for complete search history.

(56) References Cited

U.S. PATENT DOCUMENTS

| | | | | | |
|---|---|---|---|---|---|
| 1,466,175 | A | * | 8/1923 | Kramer | B60P 3/225 |
| | | | | | 220/564 |
| 1,696,954 | A | | 1/1929 | Lawrence | |
| 1,704,662 | A | | 3/1929 | Harris | |
| 1,791,588 | A | * | 2/1931 | Vogel | B60P 3/22 |
| | | | | | 280/838 |

(Continued)

FOREIGN PATENT DOCUMENTS

WO     2012016163 A2     2/2012

OTHER PUBLICATIONS

Product Line Overview Customizeable to Meet your Needs, Blueline Bobtail, www.westmor-ind.com, 2013, p. 1.

(Continued)

*Primary Examiner* — Timothy P. Kelly
(74) *Attorney, Agent, or Firm* — Todd R. Fronek; Larkin Hoffman Daly & Lindgren, Ltd.

(57) ABSTRACT

Fuel delivery vessels and vehicles are described. Some embodiments include nozzles for access by an operator. Some embodiments include optimized size and material characteristics. Some embodiments include various dispensing systems.

20 Claims, 19 Drawing Sheets

(56)          References Cited

U.S. PATENT DOCUMENTS

| 2,430,956 | A | * | 11/1947 | Scott | F16K 27/07 |
| | | | | | 137/75 |
| 2,632,577 | A | * | 3/1953 | Sacco | B60P 3/22 |
| | | | | | 220/564 |
| 2,784,747 | A | * | 3/1957 | Weempe | B60P 3/2215 |
| | | | | | 141/54 |
| 4,091,848 | A | * | 5/1978 | Phillips | B60Q 9/00 |
| | | | | | 141/94 |
| 5,823,235 | A | | 10/1998 | Alley et al. | |
| 5,975,162 | A | | 11/1999 | Link, Jr. | |
| 6,021,823 | A | | 2/2000 | Hale | |
| 6,216,719 | B1 | | 4/2001 | Meyer | |
| 10,519,027 | B2 | | 12/2019 | Wruck et al. | |
| 11,878,621 | B2 | * | 1/2024 | Wruck | B60P 3/2265 |
| 2013/0292387 | A1 | | 11/2013 | Spencer et al. | |
| 2017/0283240 | A1 | * | 10/2017 | Wruck | B67D 7/845 |

OTHER PUBLICATIONS

Lin's Propane Trucks Vehicle Brochure 2016, Top 10 Reasons, p. 1.
Amthor Propane Vehicle Brochure, Amthor Tank Trucks; AmthorInternational.com, 2014, pp. 1-6.
Propane Education and Research Council Educational Module 2007; 2007 Certified Employee Training Program, pp. 1-16.
Lin's Propane Trucks—Product Web Site (available at http://linspropanetrucks.com/the-lins-difference/), 2016, pp. 1-2.
Lin's Propane Trucks—Product Video (available at hllps://www.youtube.com/watch?v=fMuOeRCMH8k) (published Mar. 2016), p. 1.
Western Cascade—Product Web Site (available at https://www.westemcascade.com/lpgdeliverybobtail/), 2016, p. 1-3.

* cited by examiner

FLUID TRANSPORTATION AND DELIVERY APPARATUS

BACKGROUND

Delivery vehicles for transporting and delivering fluid commodities (e.g., fuels such as propane) generally include various fluid connections for exchange of fluid (e.g., vapor and/or liquid) to and from a cargo tank or vessel of the vehicle. These fluid connections may be accessed frequently by an operator when making deliveries or performing refilling or maintenance operations. The ease and efficiency of use of these fluid connections are thus a limiting factor in the overall effectiveness of the vehicle for a given operation. The effectiveness of the vehicle may also be limited by the size of the cargo tank and the selection of appropriate cargo tank sizes may be limited by economic factors affecting the operation.

Thus there is a need in the art for a fuel transportation and delivery apparatus having improved efficiency and effectiveness.

DESCRIPTION

Figure 1:
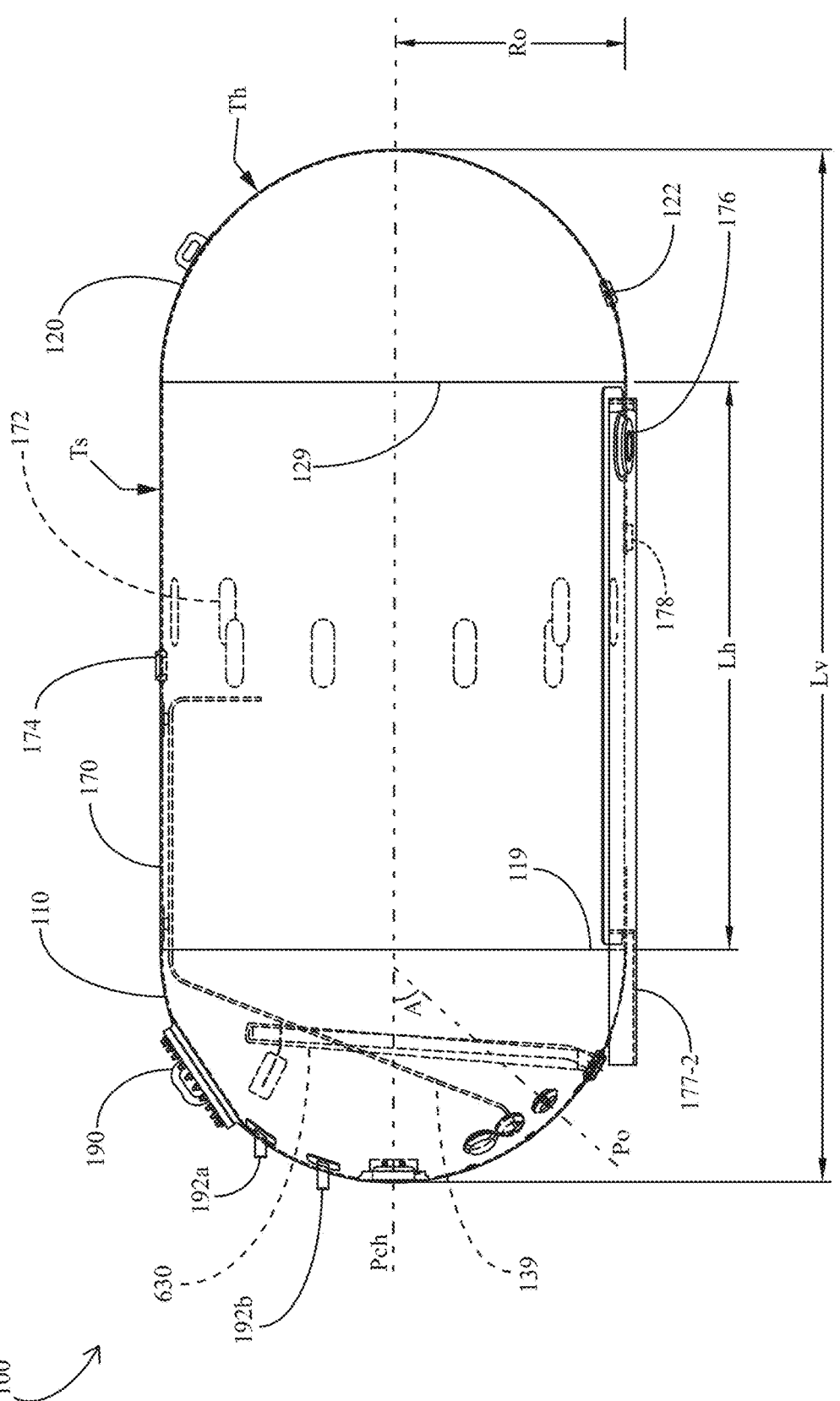
FIG. 1 is a side elevation view of an embodiment of a vessel.
Figure 2:
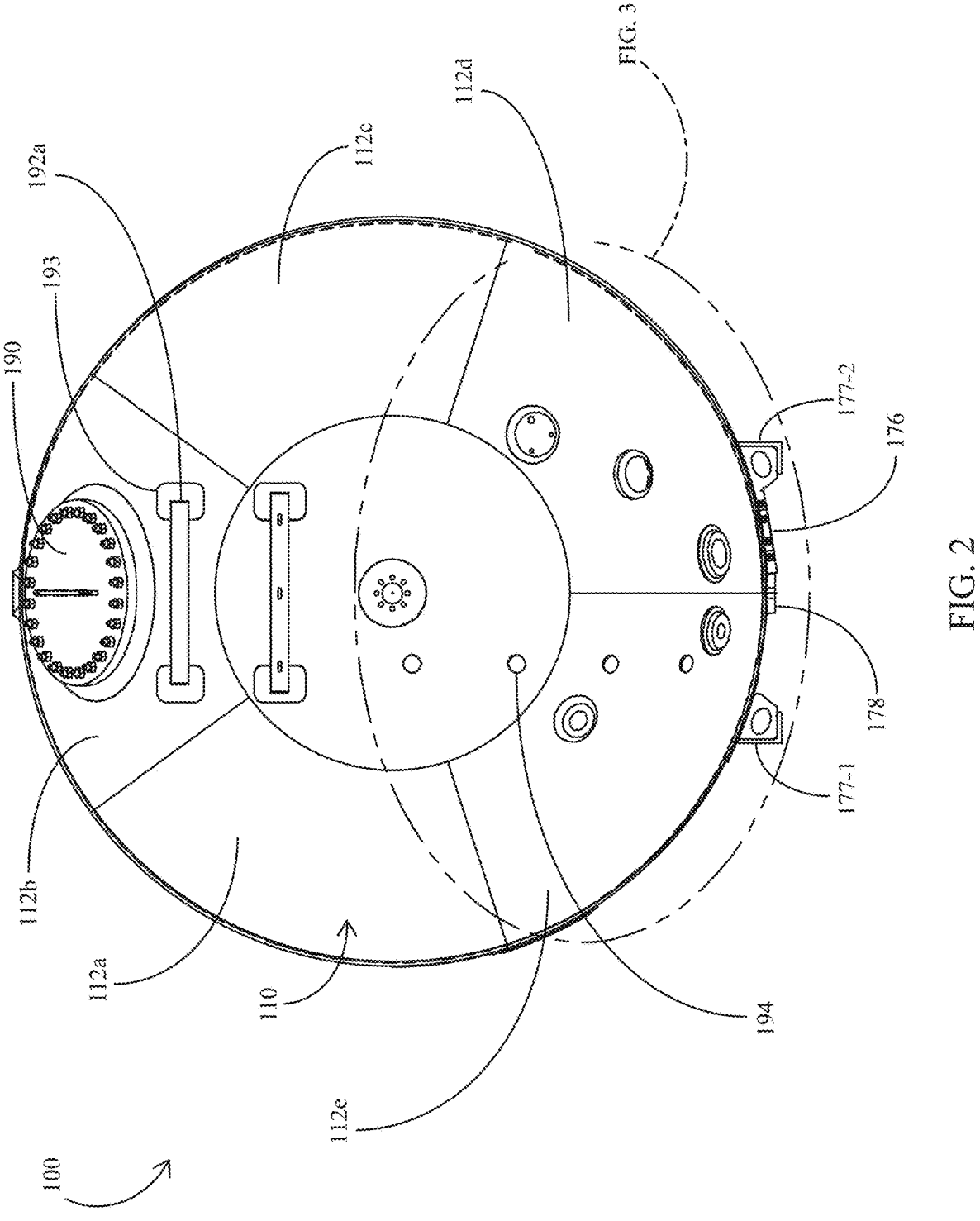
FIG. 2 is a rear elevation view of the vessel of FIG. 1.
Figure 3:
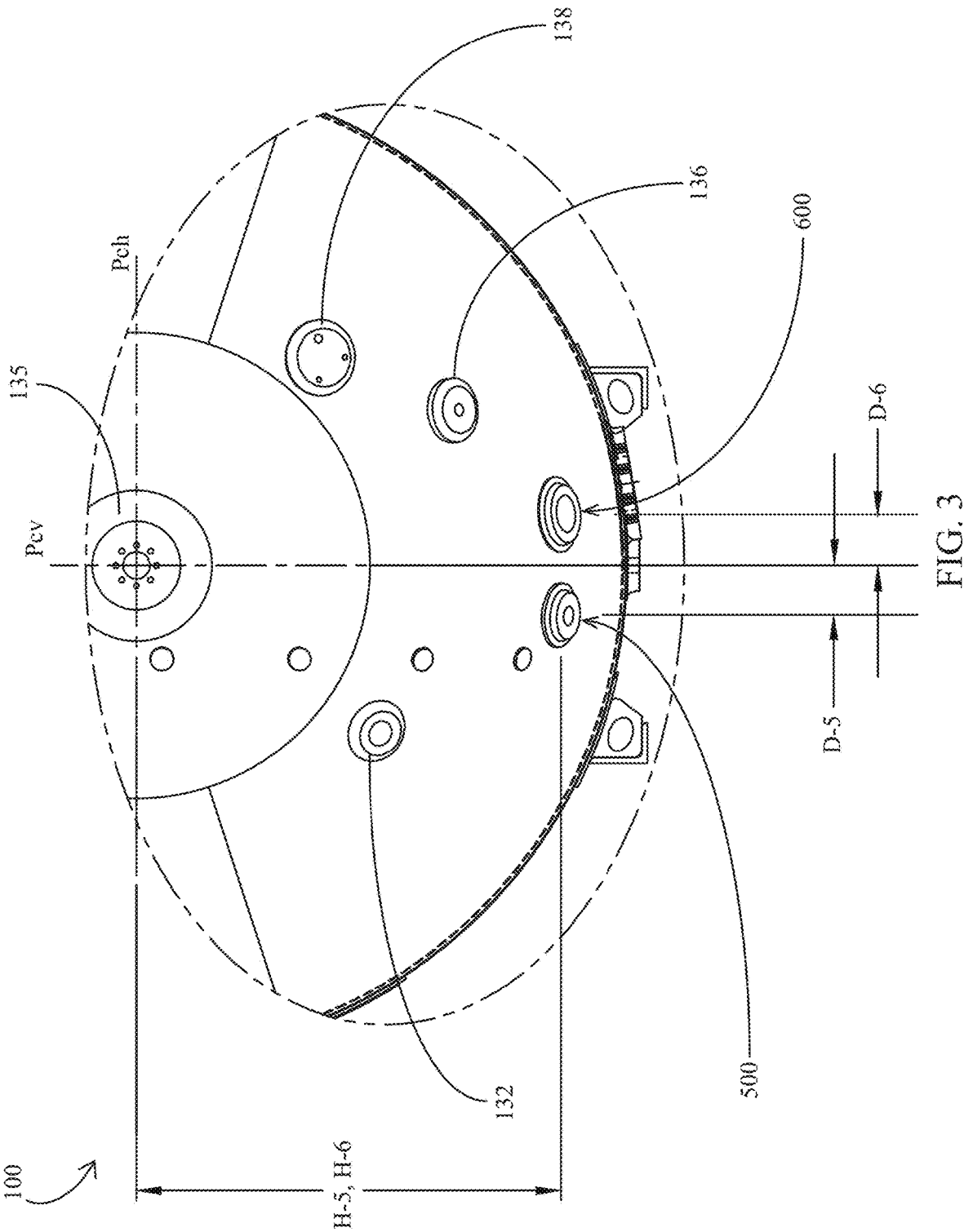
FIG. 3 is an expanded rear elevation view of the vessel of FIG. 1.
Figure 4:
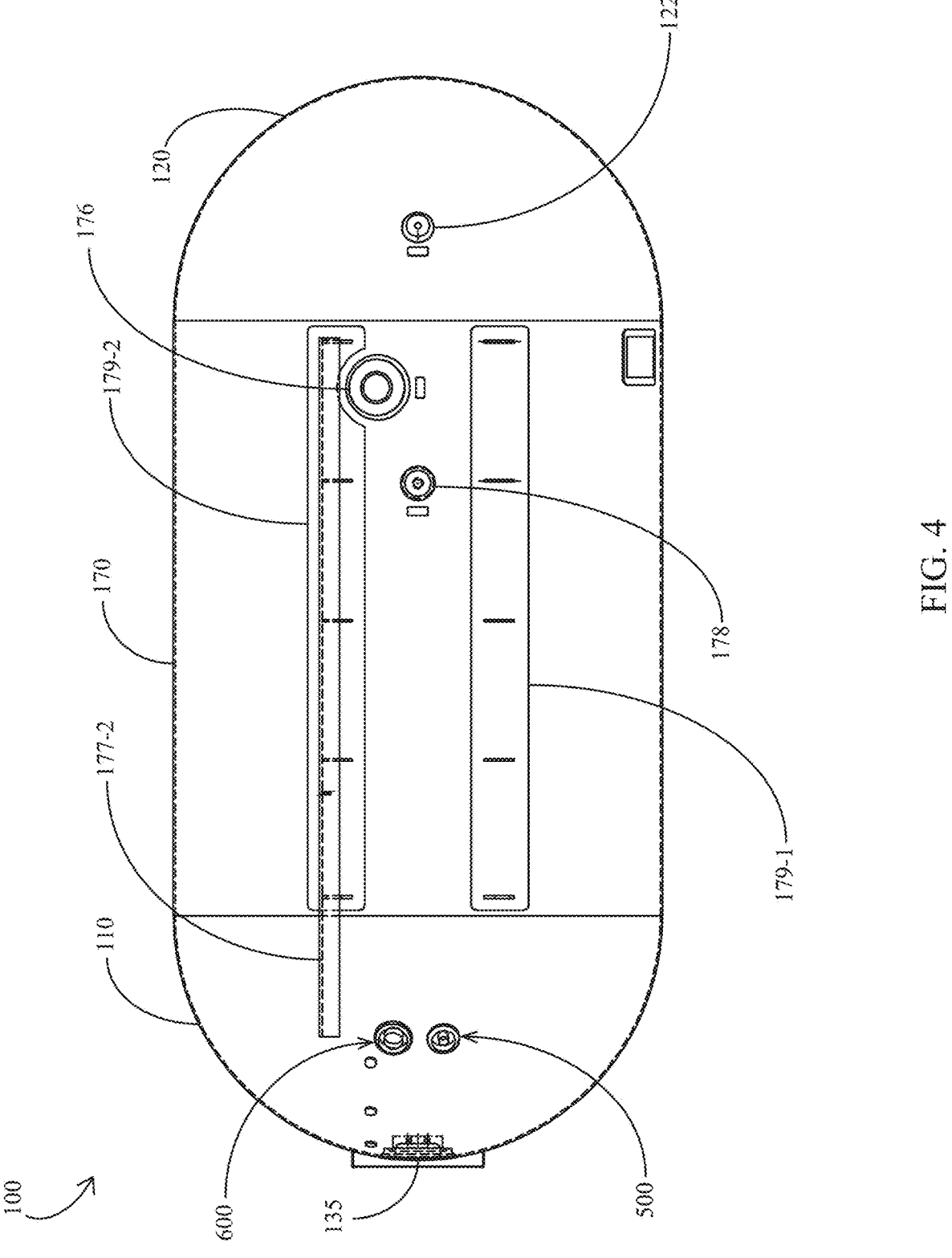
FIG. 4 is a bottom view of the vessel of FIG. 1.

Referring to the drawings, wherein like reference numerals designate identical or corresponding parts throughout the several views, FIGS. 1-4 illustrate an embodiment of a vessel 100 (e.g., a cargo tank for containing a fluid commodity such as propane or other fuel in liquid and/or vapor phase).

The vessel 100 optionally includes a cylindrical shell 170 mounted (e.g., by welding at a first annular seam 119) to a rear head 110 and mounted (e.g., by welding at a second annular seam 129) to a forward head 120. The heads 110, 120 optionally comprise a plurality of plates (such as plates 112a through 112e) which may be formed (e.g., pressed) prior to being joined (e.g., e.g., by welding) to form a generally head-shaped (e.g., dome-shaped) structure; in other embodiments the heads may comprise unitary structures. The shell 170 and heads 110 are optionally made of metal such as steel (e.g., a high-strength steel such as ASME 517E or ASME 516-70, or in other embodiments a mild steel such as ASME 612). After the shell 170 and heads 110, 120 are joined and certain additional components have been mounted thereto as described herein, in some embodiments (optionally including those made from high-strength steel) the vessel 100 may be heat treated (e.g., quenched and tempered) prior to completion of the vessel and mounting the vessel to the vehicle as described herein.

The vessel 100 is optionally mounted to rails 177-1, 177-2 for mounting to a vehicle chassis. The rails 177-1, 177-2 are optionally generally parallel and mounted to a lower portion of the shell 170. A lateral spacing of the rails 177-1, 177-2 optionally corresponds to a lateral width of the vehicle chassis. In embodiments in which the vessel 100 is heat treated, the rails 177-1, 177-2 are optionally mounted (e.g., welded) to rail mounting pads 179-1, 179-2 respectively which are optionally welded to the shell 170 prior to heat treating.

The vessel 100 is optionally provided with fluid connections (e.g., inlets, outlets) for placing the interior volume of the vessel in fluid communication (and/or mechanical contact) with atmosphere or with other components as described herein. The fluid connections optionally include a bypass connection 132 for connecting the vessel 100 to a differential bypass valve (not shown), which may be configured to permit a fluid commodity (e.g., a fuel such as propane) to flow back into the vessel 100 when a pump pressure exceeds a threshold associated with the bypass valve. The fluid connections optionally include an indicator connection 138. The indicator connection 138 optionally includes openings and/or other features for obtaining temperature, pressure and fill level measurements from the interior of the vessel 100. Temperature measurements may be displayed to the operator by a temperature gauge optionally mounted at the indicator connection 138 and optionally in communication with a temperature probe (not shown) disposed in the interior volume of the vessel 100. Pressure measurements may be displayed to the operator by a pressure gauge optionally in communication with a pressure sensor (not shown) disposed in the interior volume of the vessel 100. Fill level indication may be presented to the user by opening a selectively openable valve (not shown) which permits fluid to evacuate the vessel when the fill height meets or exceeds the height of an outlet tube 139 optionally in fluid communication with the indicator connection 138. Fill level indication may also be presented to the user by a fill level gauge (not shown) in communication with a fill level opening 135; the fill level gauge is optionally operably connected to a float (not shown) which is optionally buoyantly retained at or above the fill level of the vessel 100. The fill level gauge reading optionally increases with increasing height of the float.

The fluid connections optionally include a pump outlet 176 which is optionally in fluid communication with a pump (e.g., pump 276 illustrated in FIG. 9 described herein) which pumps the fluid commodity (e.g., fuel) through a meter to a delivery nozzle. The pump outlet 176 is optionally disposed on the shell 170 and near the bottom of the vessel 100.

The fluid connections optionally include a drain outlet 178 disposed at or near the bottom of the vessel 100 (e.g., at the bottom of the shell 170 as illustrated) in order to permit fluid to drain from the tank by gravity when the outlet 178 is opened.

Figure 8:
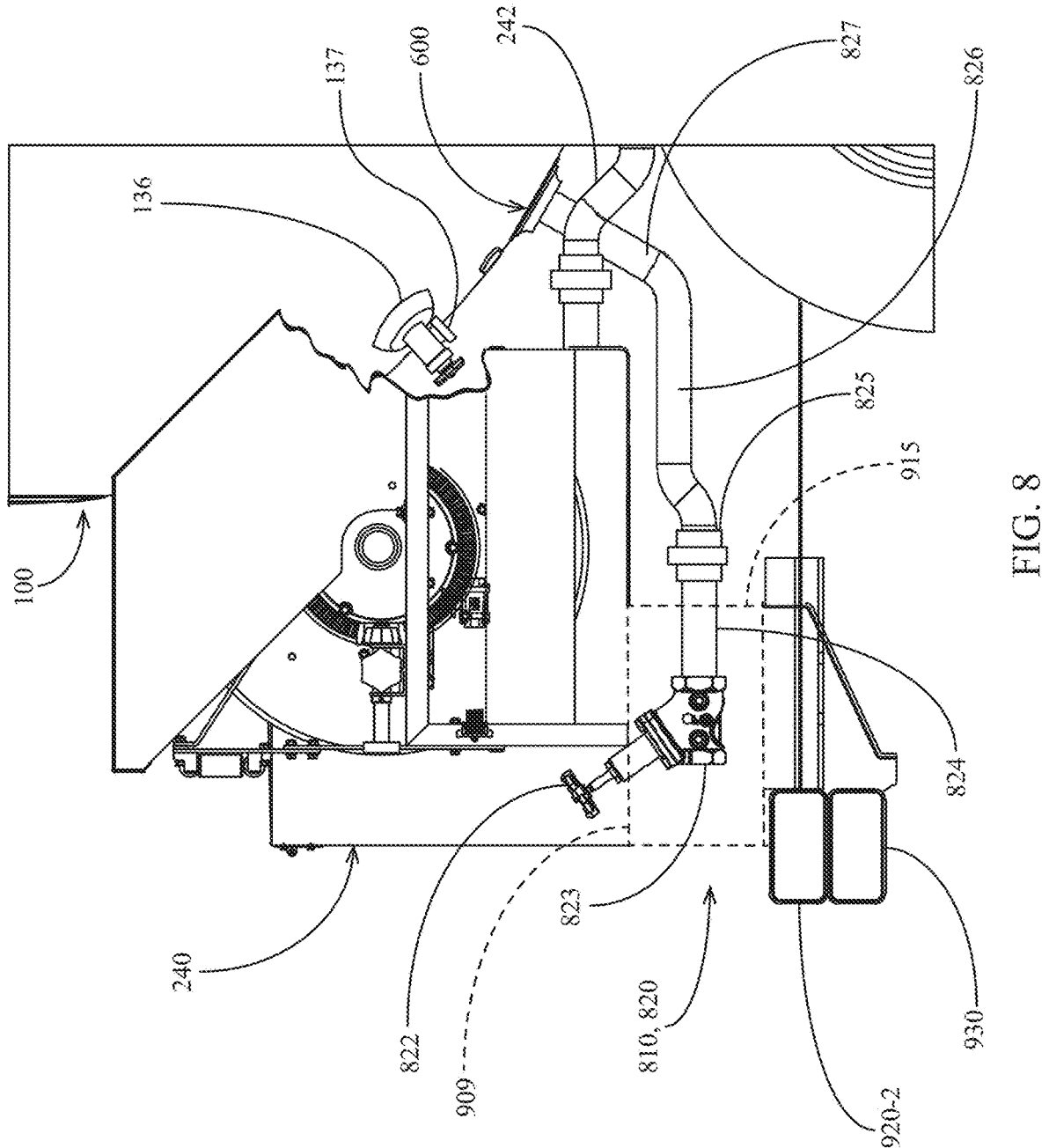
FIG. 8 is an expanded side elevation view of the fuel delivery vehicle of FIG. 7 with certain components not shown for clarity.

The fluid connections optionally include a vapor outlet 136 (e.g., provided in the rear head 110) and a liquid outlet 122 (e.g., provided in the forward head 120). The vapor outlet 136 may be operably connected to a selectively actuatable nozzle 137 as illustrated in FIG. 8.

The fluid connections optionally include a relief outlet 174 (e.g., provided on an upper portion of the shell 170) which is optionally in fluid communication with a relief valve (not shown) configured to release vapor from the vapor space in the upper portion of the vessel 100 when the vessel pressure exceeds a threshold pressure associated with the relief valve.

Some or all of the fluid connections described herein optionally comprise flanges such as annular flanges. The flanges are optionally mounted (e.g., by a welding process such as flush welding) to openings provided in the vessel 100, optionally prior to any application of heat treating (e.g., quenching and tempering) to the vessel. The flanges optionally define an axis normal (or approximately normal or generally normal) to a plane defined by the openings in which the flanges are mounted; for example, an opening in the flange may define a central axis normal to the opening, or an annular surface of the flange may define a central axis normal to the opening. In other embodiments, one or more fluid connections may comprise a coupling mounted in the opening at a non-normal angle to a plane defined by the opening in which the coupling is mounted, e.g., by fillet welding.

Figure 5:
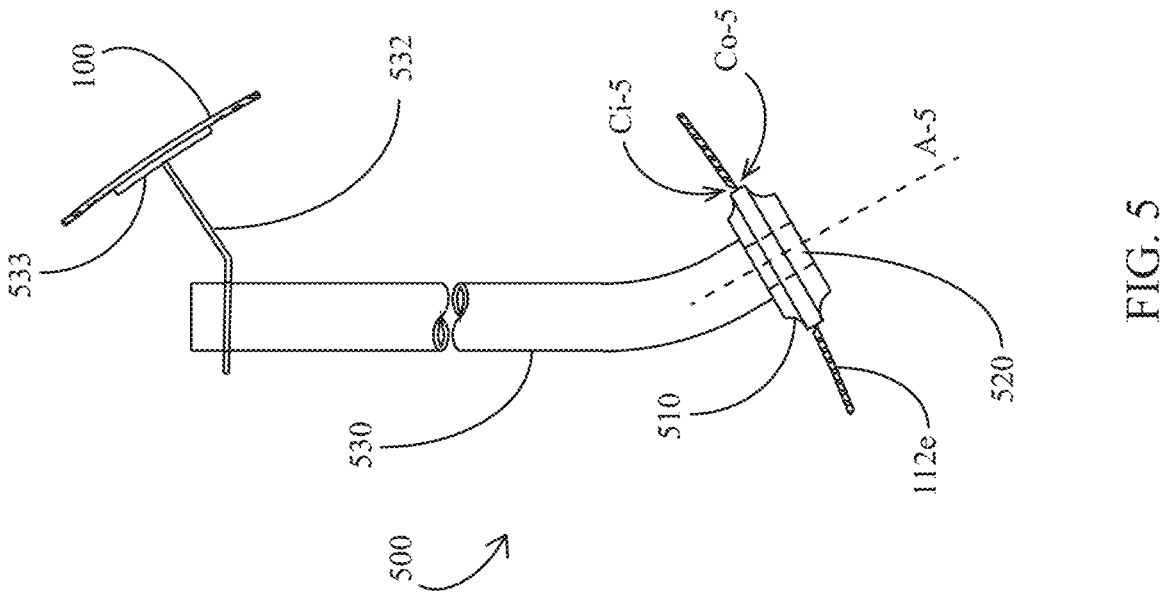
FIG. 5 illustrates an embodiment of a vapor equalizing connection assembly.

As illustrated in FIG. 5, the fluid connections optionally include a vapor equalizing connection assembly 500. The assembly 500 optionally includes a flange 510 (e.g., an annular flange) having an opening 520 (e.g., circular opening) therethrough. The flange 510 is optionally mounted in an opening provided in the pressure vessel, e.g., in the plate 112e of head 110 as illustrated. The flange 510 (e.g., the opening 520 thereof and/or the outer circumference thereof) optionally defines an axis A-5 which is optionally normal to the opening in which the flange 510 is mounted (e.g., normal to a plane defined by the opening). A portion of the flange 510 (e.g., a central, widened portion as illustrated) is optionally flush with the surface of the pressure vessel. The opening 520 is optionally in fluid communication with a tube 530 which optionally extends to an upper portion of the pressure vessel 100. An upper portion of the tube 530 is optionally supported by a bracket 532 mounted (e.g., by welding, optionally prior to heat treatment) to an interior surface of the vessel 100. In some embodiments (e.g., embodiments in which the vessel is heat treated, such as by quenching and tempering, prior to installation of the tube 530) the bracket 532 is optionally mounted (e.g., by welding) to a reinforcement pad 533 which is in turn mounted (e.g., by welding) to an interior surface of the vessel 100.

In installation of the flange 510, an inner weld (e.g., flush weld) is optionally applied within a circumferential groove Ci-5 (e.g., a v-shaped groove) on the interior surface of the vessel and disposed radially between the outer surface of the flange and the opening in the vessel 100. The groove Ci-5 may be formed by the angle of the outer surface of the flange relative to the inner surface of the opening in the vessel 100, which may be determined by the shape of the outer surface of the flange and/or by the shape of the inner surface of the opening, which may be modified by a shaping step (e.g., grinding, boring) performed after the opening is formed in the vessel 100. An outer weld (e.g., U-groove weld) is optionally applied around the outer circumference Co-5 of the flange 510 on the outside of the vessel 100.

During filling operations, vapor optionally enters and/or escapes the vessel 100 via the vapor equalizing connection assembly 500 depending on the pressure in a vapor space formed in an upper portion of the vessel 100. Exchange of vapor between a bulk fill tank (not shown) and the vessel 100 via the assembly 500 may equalize a vapor pressure of the bulk fill tank relative to that of the vessel 100.

Figure 6:
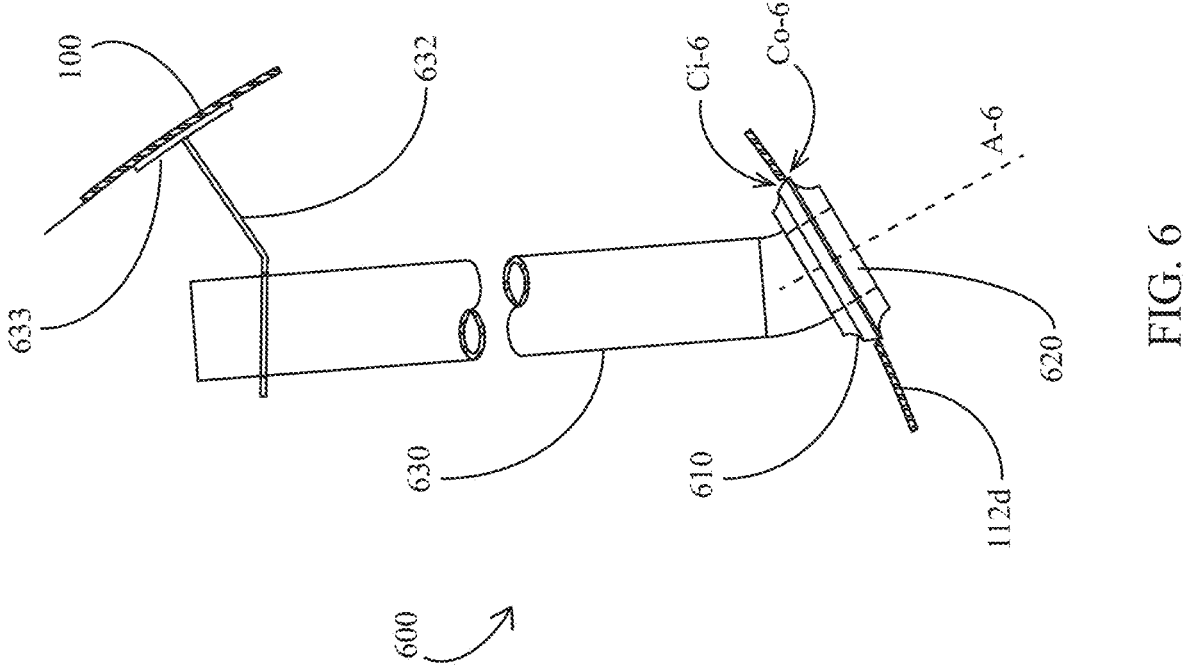
FIG. 6 illustrates an embodiment of a liquid fill connection assembly.

As further illustrated in FIG. 6, the fluid connections optionally include a liquid fill connection assembly 600 (e.g., spray fill connection assembly). The assembly 600 optionally includes a flange 610 (e.g., an annular flange) having an opening 620 (e.g., circular opening) therethrough. The flange 610 is optionally mounted in an opening provided in the pressure vessel, e.g., in the plate 112d of head 110 as illustrated. The flange 610 (e.g., the opening 620 thereof and/or the outer circumference thereof) optionally defines an axis A-6 which is optionally normal to the opening in which the flange 610 is mounted (e.g., normal to a plane defined by the opening). A portion of the flange 610 (e.g., a central, widened portion as illustrated) is optionally flush with the surface of the pressure vessel. The opening 620 is optionally in fluid communication with a tube 630 which extends to an upper portion of the pressure vessel 100. An upper portion of the tube 630 is optionally supported by a bracket 632 mounted (e.g., by welding, optionally prior to heat treatment) to an interior surface of the vessel 100. In some embodiments (e.g., embodiments in which the vessel is heat treated, such as by quenching and tempering, prior to installation of the tube 630) the bracket 632 is optionally mounted to a reinforcement pad 633 which is in turn mounted (e.g., by welding) to an interior surface of the vessel 100.

In installation of the flange 610, an inner weld (e.g., flush weld) is optionally applied within a circumferential groove Ci-6 (e.g., a v-shaped groove) on the interior surface of the vessel and disposed radially between the outer surface of the flange and the opening in the vessel 100. The groove Ci-6 may be formed by the angle of the outer surface of the flange relative to the inner surface of the opening in the vessel 100, which may be determined by the shape of the outer surface of the flange and/or by the shape of the inner surface of the opening, which may be modified by a shaping step (e.g., grinding, boring) performed after the opening is formed in the vessel 100. An outer weld (e.g., U-groove weld) is optionally applied around the outer circumference Co-6 of the flange 610 on the outside of the vessel 100.

During filling operations, a fluid commodity (e.g., a fuel such as propane) optionally enters the vessel 100 via the liquid fill connection assembly 600.

In some embodiments, (e.g., those in which the vessel 100 is heat treated such as by quenching and tempering) reinforcement pads may be used to mount additional components to the vessel indirectly. Baffle mounting pads 172 (e.g., mounted in a circumferential array about the interior surface of the shell 170 as illustrated) may be used to mount baffles (not shown) extending diametrically across the interior volume of the vessel 100 on order to disrupt the movement of fluid within the vessel. Light bar mounting pads 193 may be used to mount light bars 192a, 192b, which optionally support light fixtures. Line support mounting pads 194 (e.g., mounted in a generally aligned array to the rear head 110 as illustrated) may also be used to mount line supports for supporting electrical harnesses and other lines to be routed across the outer surface of the vessel 100.

The vessel 100 optionally includes a manway 190 which is optionally removably mounted (e.g., bolted) to the vessel, such as on the rear head 110 as illustrated, and optionally sized to allow a maintenance operator to enter and exit the vessel.

In an exemplary embodiment of the vessel 100, the vessel is sized to contain 3700 gallons of fluid commodity (e.g., fuel). In such an embodiment, the shell 170 optionally has a radius Ro of 42 inches, shown in FIG. 1 with respect to a central horizontal plane Pch of the vessel 100. In the same exemplary embodiment, a shell length Lh of the shell 170 is optionally 102.5 inches and the overall length Lv of the vessel 100 is optionally 186.5 inches.

The shell 170 and heads 110, 120 have wall thicknesses Ts, Th, respectively, which are optionally selected in accordance with the specified design pressure, diameter and material properties of the vessel 100. As an example, a 3700-gallon embodiment may be made of high-strength steel (e.g., ASME 517E), and the head thickness Th is optionally less than a quarter inch (e.g., 0.22 inches or 0.2 inches) and the thickness Ts is optionally less than a half inch (e.g., 0.37 inches or 0.375 inches). It should be appreciated that the use of high-strength steel may effectively decrease the lower end of a suitable range of material thicknesses, thus reducing the total weight of the tank and permitting a larger payload (e.g., 3700 gallons) on a smaller vehicle (e.g., a truck having a single rear axle such as the 223-inch wheelbase exemplary vehicle described herein). In the various embodiments described herein, the wall thickness Th is optionally greater than or equal to the wall thickness Ts. The wall thicknesses Th of heads 110, 120 are optionally equal or approximately equal.

Turning now to FIGS. 7-10, the vessel 100 is shown mounted to a chassis 220 of a vehicle 200 (e.g., a fuel delivery truck such as a propane bobtail). The chassis 220 optionally includes one or more longitudinally extending truck frame rails 222. The vehicle 200 may be a single-axle vehicle having a front axle 210a and a single rear axle 210b as illustrated. In other embodiments, the vehicle 200 may be a double-axle vehicle having two rear axles. In various embodiments, the chassis 220 may be rigidly coupled to the vehicle or may be articulated to pivot about a vertical axis relative to the vehicle cab. The vehicle 200 may comprise a fluid delivery control system having features and functionality in common with the disclosures of U.S. Pat. Nos. 5,975,162 and 5,823,235, and 6,216,719, all of which are hereby incorporated by reference in their entirety herein.

In an exemplary vehicle embodiment (e.g., an embodiment configured to support the exemplary 3700-gallon vessel described above), a wheelbase Lb of the vehicle (e.g., the distance between the front axle 210a and a single rear axle 210b) may be 223 inches and a chassis length Lc of the vehicle may be 209 and 5/16 inches. As shown in the illustrated embodiment, the rearward first annular seam 119 may be disposed forward of the rear axle 210b along the direction of travel of the vehicle.

Figure 9:
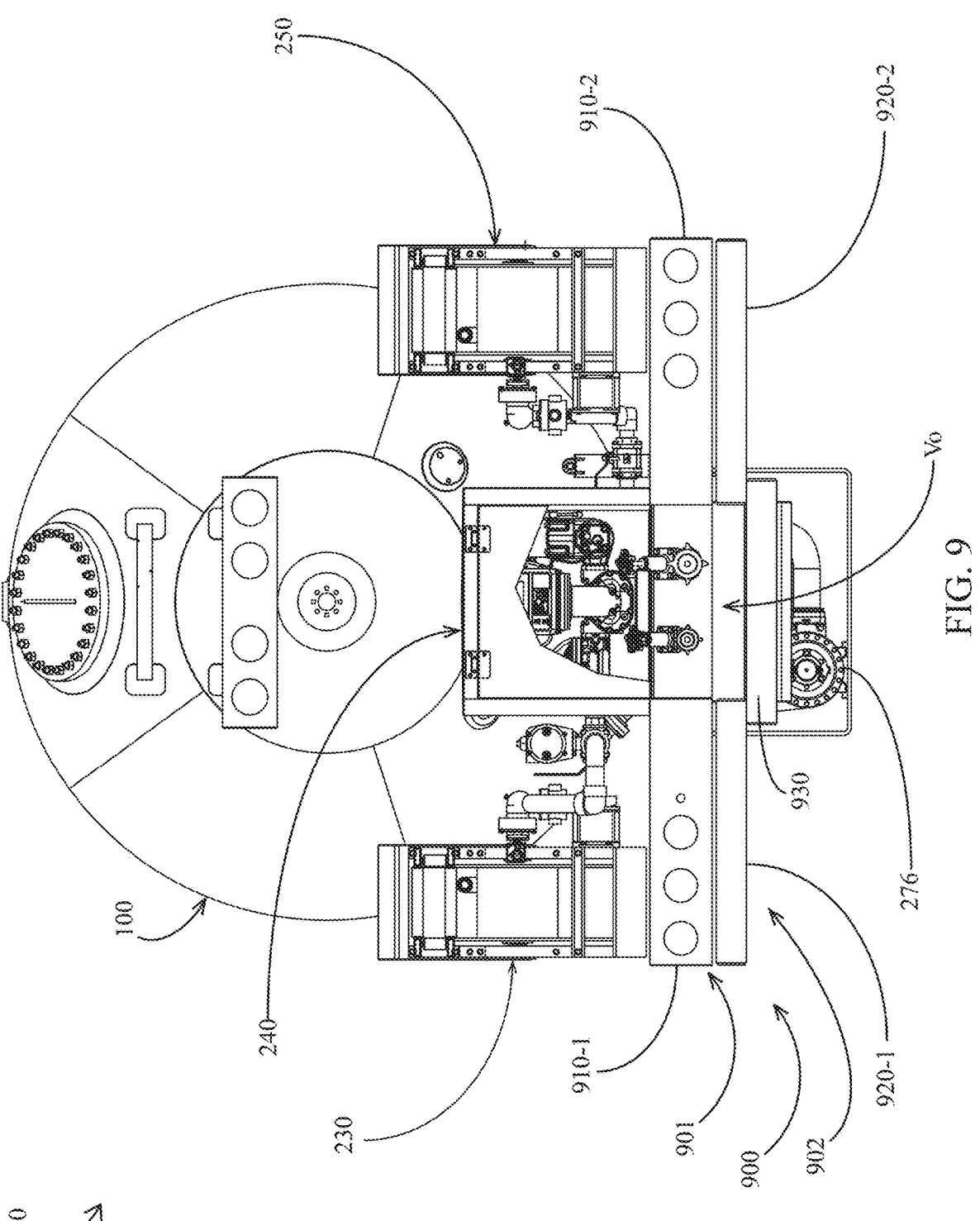
FIG. 9 is a rear elevation view of the fuel delivery vehicle of FIG. 7.

Referring to FIG. 9, a rearward portion 900 of the vehicle optionally includes a deck 901 optionally comprising a left deck portion 910-1 and right deck portion 910-2, which portions may be laterally spaced apart as illustrated. The rearward portion 900 of the vehicle also optionally includes a bumper 902 optionally comprising a left bumper portion 920-1 and a right bumper portion 920-2, which portions may be laterally spaced apart as illustrated. The bumper 902 also optionally comprises a central bumper portion 930, which is optionally disposed beneath and mounted to lower surfaces of the left and right bumper portions 920-1, 920-2; in other embodiments, the central bumper portion 930 is generally parallel with the left and right bumper portions 920-1, 920-2, and in such embodiments the bumper 902 may comprise a unitary structure.

The deck 901 optionally supports various apparatus for use by the operator in controlling and monitoring fluid flow to and from the vessel 100. In various embodiments, such apparatus may be in fluid communication with the vessel 100. As illustrated, the deck 901 may support a meter assembly 240 in fluid communication with the vessel 100 and optionally configured to measure and display an amount of fluid dispensed from the vessel. The deck 901 may also support a vapor discharge assembly 230 for supporting a hose and nozzle configured to discharge vapor from the vessel 100. The deck 901 may also support a liquid discharge assembly 250 for supporting a hose and nozzle configured to discharge liquid from the vessel 100, e.g., via the meter assembly 240.

Conduit assemblies 810, 820 (e.g., piping assemblies) optionally extend generally rearward (and optionally generally downward) from the vessel 100 and are optionally in fluid communication with the interior volume of the vessel via the vapor equalizing connection assembly 500 and liquid fill connection assembly 600, respectively.

Figure 10:
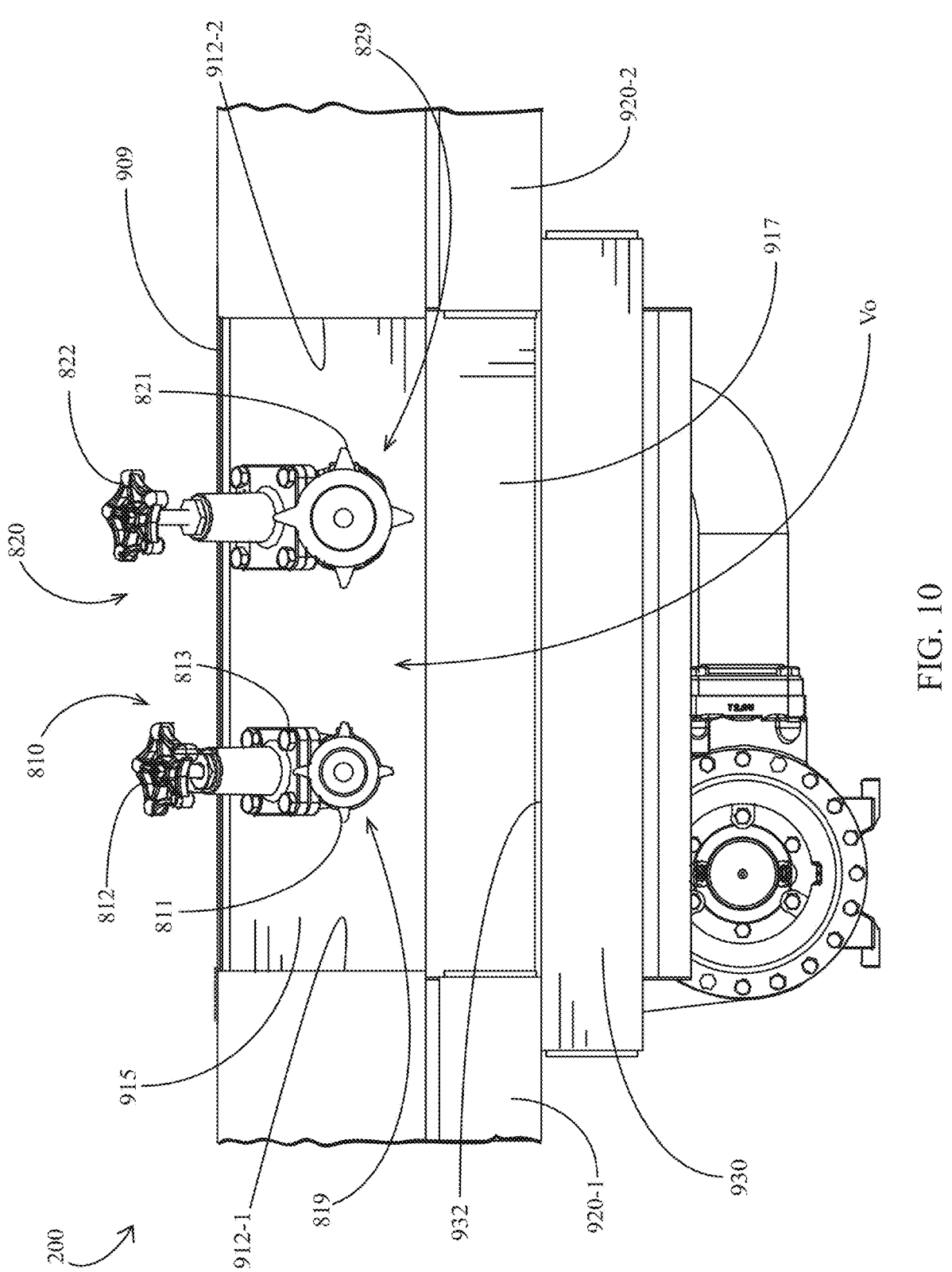
FIG. 10 is an expanded rear elevation view of the fuel delivery vehicle of FIG. 7.

The liquid fill conduit assembly 820 optionally comprises a conduit 827 (e.g., pipe) mounted to the liquid fill connection assembly 600 (e.g., by threading in the threaded opening 620 thereof). The conduit 827 is optionally downwardly angled (e.g., at an angle greater than 45 degrees below horizontal such as 50 or 60 degrees below horizontal). The conduit 827 optionally has a rearward, distal end positioned below an upper surface 909 of deck 901. The conduit 827 is optionally connected to (e.g., threaded or welded to or formed as a unitary part with) a conduit 826 (e.g., pipe), which optionally extends rearwardly of the conduit 827 and optionally extends beneath the upper surface 909 of deck 901. The conduit assembly 820 optionally extends through an opening formed in a laterally extending wall 915 of the deck 901. The opening in the wall 915 may comprise a hole sized to receive a conduit of the conduit assembly therethrough or a notch having an open upper end sized to receive a conduit of the conduit assembly downward into the notch; in some embodiments, the wall 915 may be omitted altogether. In the illustrated embodiment, a conduit 824 (e.g., pipe) extends rearwardly through the wall 915 and is optionally connected to the conduit 826 by a fitting 825 (e.g., a threaded fitting) which is optionally disposed forward of forward wall 915; in other embodiments, the conduit 826 may instead extend directly through the forward wall 915. The conduit 824 (or conduit 826 in some embodiments) is optionally connected at a rearward, distal end to a valve 823 (e.g., on-off valve) optionally configured to selectively close the conduit assembly 810 to fluid flow by actuation of a controller 822 (e.g., knob, lever, solenoid). As shown in FIG. 10, a removable (e.g., threaded) cap 821 optionally selectively closes a nozzle 829 optionally positioned at a rearward distal end of the valve 823. In operation, the cap 821 may be removed for connection of the nozzle 829 to a fill hose and the valve 823 opened using controller 822 to commence filling operations. One or more of the controller 822, valve 823, nozzle 829 and cap 821 are optionally disposed rearward (and optionally upstream) of the wall 915; in some embodiments. One or more of the controller 822, valve 823, nozzle 829 and cap 821 are optionally disposed at least partially within an open volume Vo. In some embodiments, the open volume Vo comprises an open space disposed within a bounding volume (e.g., minimum bounding volume, bounding box, minimum bounding box, etc.) of the deck 901. Other components such as a brake interlock assembly (not shown) may also be associated with the conduit assembly 820 and optionally disposed rearward of the wall 915 and optionally at least partially within the open volume Vo.

The vapor equalizer conduit assembly 810 optionally comprises a series of conduits such as pipes (not illustrated) similar to those of the liquid fill conduit assembly 820 and mounted to the vapor equalizing connection assembly 500 (e.g., by threading in the threaded opening 520 thereof). The conduit assembly optionally extends optionally beneath the upper surface 909 of deck 901 through the wall 915 and optionally includes a valve 813 and associated controller 812 disposed rearward of the wall 915, as well as a rearward, distal nozzle 819 optionally sealed by a cap 811, also optionally disposed rearward of the wall 915.

In various embodiments, one or both of the conduit assemblies 810, 820 may comprise a conduit made of a single pipe or a plurality of pipes which may be welded or joined together by one or more fittings. In various embodiments, one or both of the nozzles 819, 829 may be disposed at or approximately at the height of chassis 220 (e.g., one or more truck frame rails 222 thereof). In various embodiments, one or both of the nozzles 819, 829 may be disposed approximately at a waist height of an operator standing generally behind the deck 901. In various embodiments, the open volume Vo is at least partially at or approximately at the height of the chassis (e.g., one or more truck frame rails thereof).

It should be appreciated that the positions and orientations of the vapor equalizer opening 520 and the liquid fill opening 620 are conducive to the routing of the associated conduit assemblies 810, 820 below the upper surface 909 of deck 901 and through the wall 915. In order to position the openings 520, 620 adjacent to the forward end of deck 901 and optionally adjacent to the upper surface 909 thereof, the openings are optionally positioned at an angle A (e.g., greater than 45 degrees such as 50 or 60 degrees) below horizontal, and the axes A-5 and A-6 are optionally also aligned with a plane Po disposed at angle A below horizontal (see FIG. 1). It should be appreciated that in some embodiments, the openings 520, 620 may not be at equal lateral offsets or vertical positions. The openings 520, 620 are also optionally disposed relatively low on the vessel 100, e.g., at heights H-5, H-6 measured below the central horizontal axis Pch of the vessel, respectively (see FIG. 3). Heights H-5, H-6 are optionally each greater than three-quarters (e.g., 80 percent, 85 percent, 86 percent, 86.6 percent, 87 percent, 90 percent, 95 percent) of the radius Ro of the vessel. The openings 520, 620 are optionally disposed below the other fluid connections on the rear head 110 of the vessel 100. The openings 520, 620 are optionally disposed at a height just above (or lateral to) the upper ends of the rails 177-1, 177-2. A single horizontal plane optionally intersects both the rail mounting pads 179 and the flanges 510, 610. The relatively low position of openings 520, 620 relative to other vessel features and geometry is particularly conducive to conduit routing in relatively tall vessel embodiments such as the 3700-gallon exemplary embodiment described herein.

In order to position the openings 520, 620 along vertical planes intersecting the wall 915 (which as described herein is a recessed central portion of the deck 901), the openings 520, 620 are optionally disposed relatively close to a central vertical plane Pcv of the vessel, e.g., at distances D-5, D-6 therefrom (see FIG. 3) which are optionally less than about 3/20 (e.g., 12 percent, about ten percent, between 5 and 10 percent) of the radius Ro of the vessel 100. In some embodiments, openings 520, 620 are positioned such that the portions of conduit assemblies extending rearwardly therefrom (e.g., the conduit 827 of conduit assembly 820) are positioned inboard of other conduits in the vehicle 200 such as conduit 242, which may place the meter assembly 240 (and/or the liquid discharge assembly 250) in fluid communication with the interior volume of the vessel 100.

Figure 7:
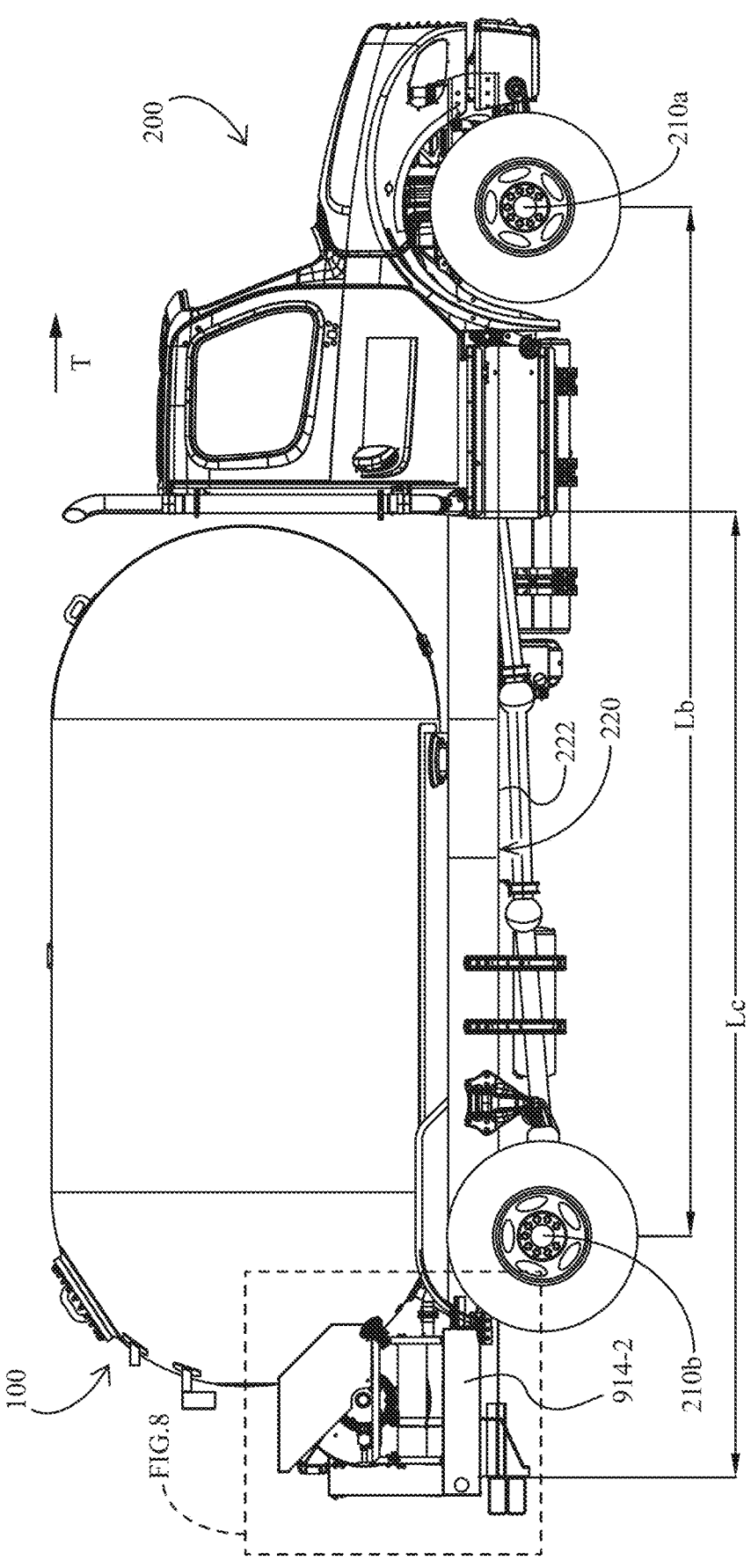
FIG. 7 is a side elevation view of an embodiment of a fuel delivery vehicle.

As may be illustrated by comparing FIG. 7 (showing right sidewall 914-2 of right deck portion 910-2) and FIG. 8 (in which the sidewall 914-2 and other parts of the deck 901 are not shown), the right deck portion 910-2 and right sidewall 914-2 at least partially conceal and protect rearward, distal portions of the conduit assemblies 810, 820 (e.g., the valves and nozzles thereof) from the right side. Similarly, the left deck portion 910-1 and a left sidewall (not shown) thereof at least partially conceal and protect the rearward, distal portions of the conduit assemblies 810, 820 from the left side.

Turning to FIG. 10, the rearward, distal portions of the conduit assemblies 810, 820 (e.g., those portions of the assemblies disposed rearward of wall 915, optionally including the valve, controller, nozzle and/or cap of each conduit assembly) are optionally disposed at least partially within an open volume Vo. The open volume Vo may be at least partially defined at lateral sides thereof by inboard sidewalls 912-1, 912-2 of the left and right deck portions 910-1, 910-2, respectively. The open volume may be at least partially defined at lateral sides thereof by inboard sidewalls of the left and right bumper portions 920-1, 920-2, respectively. The open volume Vo may be at least partially defined at a lower portion thereof by a floor 917 (which optionally extends rearwardly along a direction below horizontal and is optionally welded at a forward end thereof to the wall 915), which optionally extends from the wall 915 downward toward an upper surface 932 of the central bumper portion 930. The open volume Vo may be at least partially defined by the upper surface 932 of the central bumper portion 930. The open volume Vo may be open at a rearward side thereof, permitting an operator to access the conduit assemblies 810, 820. The open volume Vo may be open at an upper side thereof, and the controllers 812 may extend through the open upper side as illustrated in FIG. 10. It should be appreciated that in some embodiments the open volume Vo may be selectively enclosed, e.g., by a hinged or sliding housing (not shown) which may be mounted to the deck 901. In some embodiments, the transverse width of the open volume Vo may optionally correspond to the space between the truck frame rails (e.g., the rails supporting the deck).

It should be appreciated that the open volume Vo and the rearward, distal portions of the conduit assemblies 810, 820 are optionally disposed at least partially within a recessed portion of the deck 901, which is optionally recessed forwardly (e.g., to the wall 915) and optionally recessed downwardly (e.g., to the floor 917). It should be appreciated that the open volume Vo is optionally disposed at least partially within a recessed portion of the bumper 902, which is optionally recessed downwardly (e.g., to the upper surface 932 of the central bumper portion 930).

Figure 11:
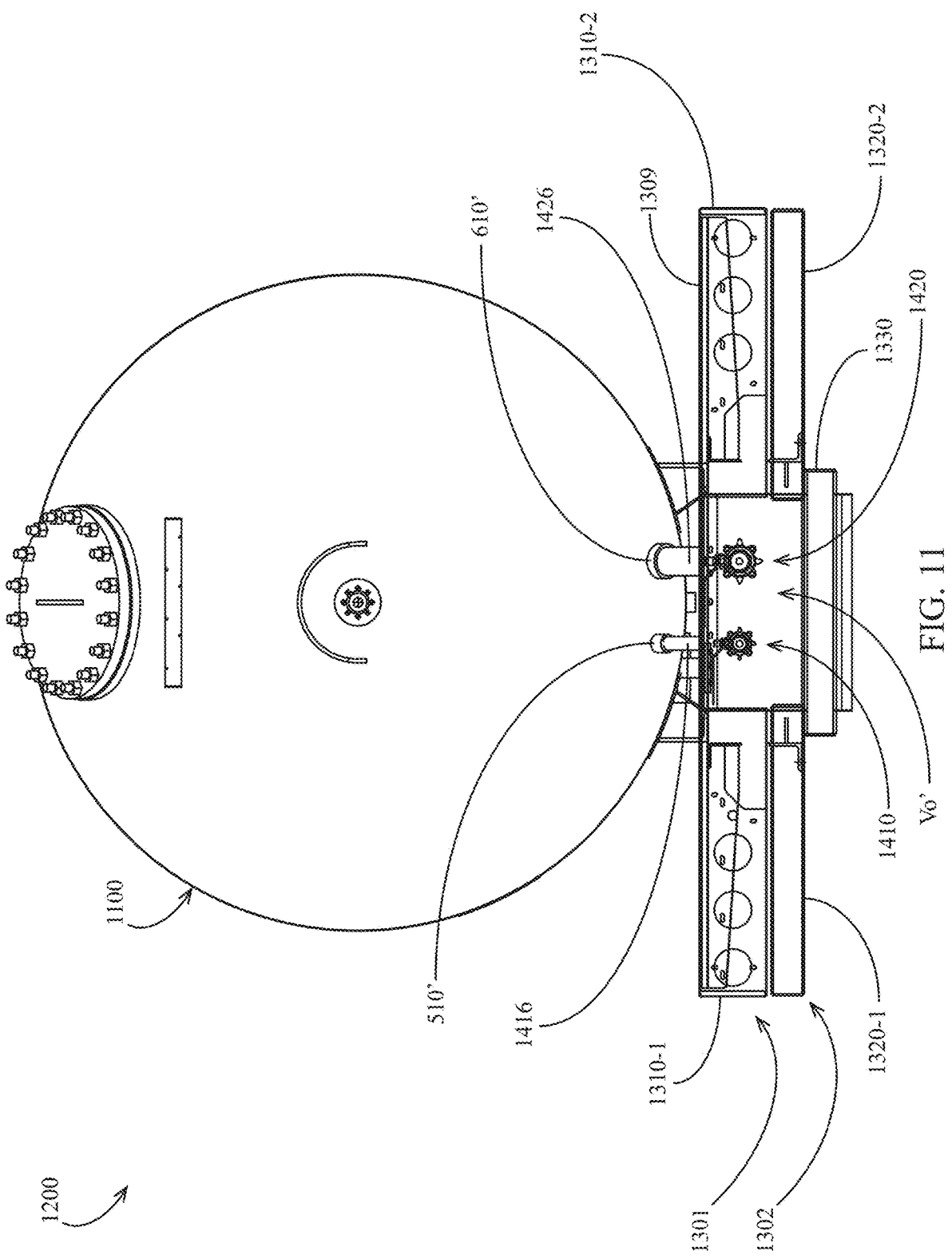
FIG. 11 is a rear elevation view of another embodiment of a fuel delivery vehicle.
Figure 12:
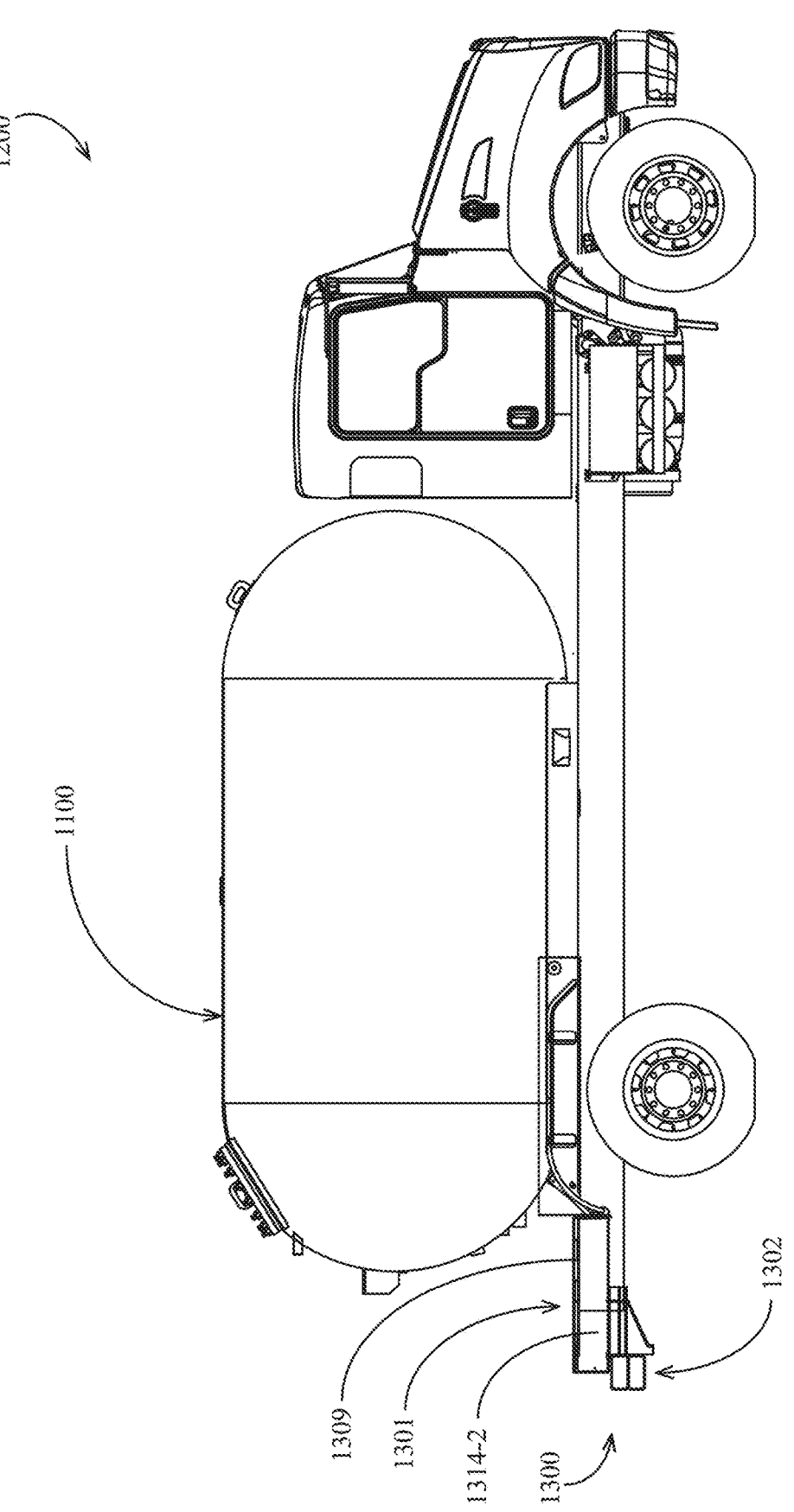
FIG. 12 is a side elevation view of the fuel delivery vehicle of FIG. 11.
Figure 13:
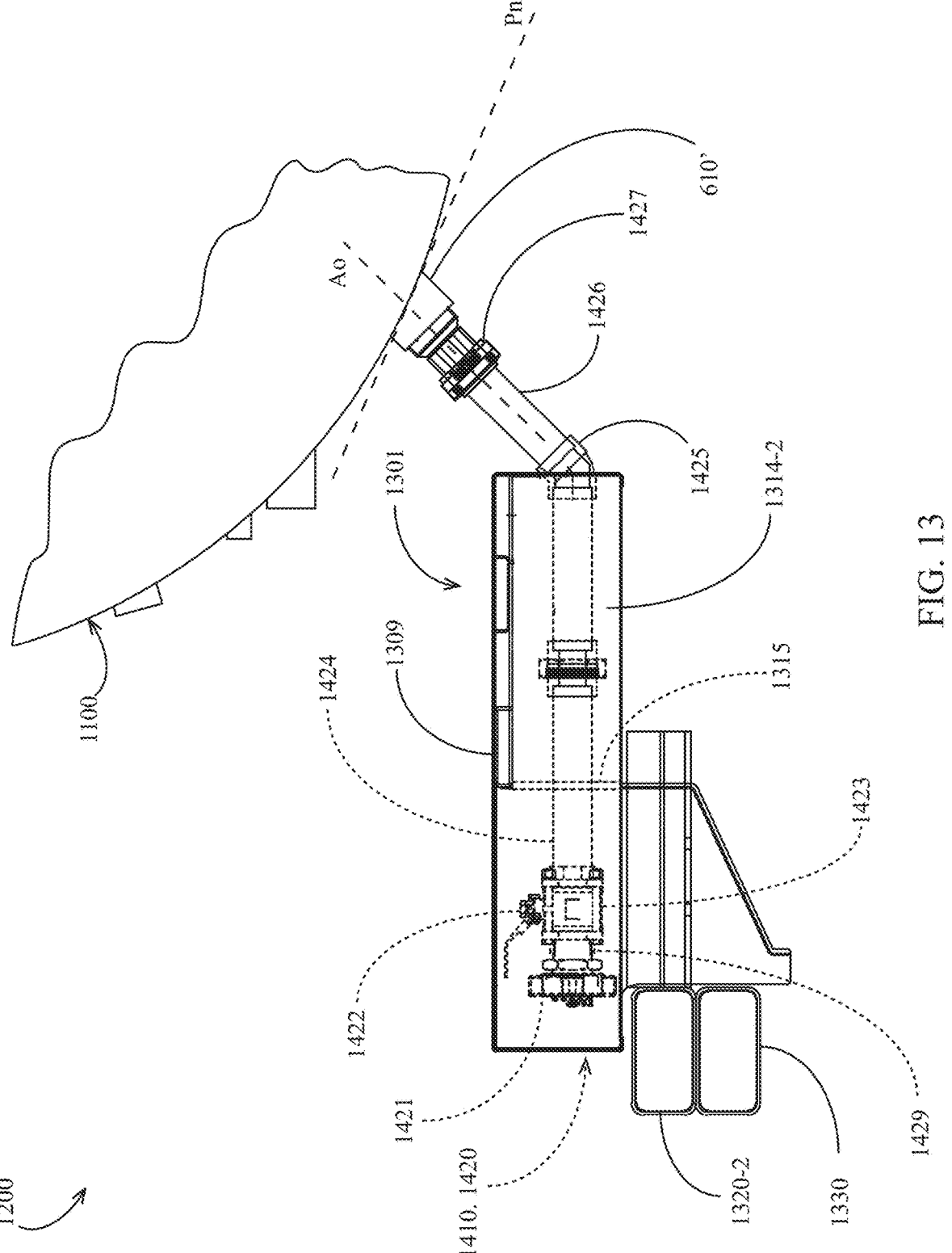
FIG. 13 is an expanded side elevation view of the fuel delivery vehicle of FIG. 11.

Turning now to FIG. 11 through FIG. 13, a vessel 1100 is shown mounted to a vehicle 1200. The vessel 1100 optionally includes generally similar features to the vessel 100 described herein. The vehicle 1200 optionally includes generally similar features to the vehicle 200 described herein, optionally including a rearward portion 1300 comprising a bumper 1302 and a deck 1301 for supporting various components which are not illustrated in FIG. 12 but may be generally similar to the assemblies supported on the deck of the vehicle 200 described herein.

The deck 1301 may comprise left and right deck portions 1310-1, 1310-2, respectively. The deck 1301 optionally includes an upper surface 1309 which is optionally extends along the lateral length of the deck. The bumper 1302 optionally comprises left and right bumper portions 1320-1, 1320-2, respectively. In some embodiments, the bumper 1302 further comprises a central bumper portion 1330 which may be recessed downwardly from (e.g., mounted to undersides of) the left and right bumper portions; in other embodiments, the bumper 1302 comprises a single unitary part which may include a similarly recessed (e.g., downwardly recessed, forwardly recessed) bumper portion or may have a generally planar upper surface. A wall 1315 of the deck 1301 is optionally recessed forwardly relative to the rearward surfaces of the left and right deck portions 1310-1, 1310-2, respectively.

An open volume Vo' is optionally defined at lateral sides thereof by inboard surfaces of the left and right deck portions 1310-1, 1310-2, respectively and/or by inboard surfaces of the left and right bumper portions 1320-1, 1320-2, respectively. The open volume Vo' is optionally defined at a lower side thereof by the bumper 1302, e.g., by an upper surface of the central bumper portion 1330. The open volume Vo' is optionally open at rearward and upper sides thereof, but may be closed by the operator using structure such a gate or door (not shown) which in some embodiments may be pivotally or slidingly mounted to the deck and/or bumper to selectively cover the open volume Vo'. The open volume Vo' is optionally defined at a forward end thereof by wall 1315, which may be oriented vertically as illustrated or angled with respect to vertical (e.g., at between 0 and 90 degrees, between 0 and 45 degrees, at 10 degrees, at 20 degrees, at 30 degrees, at 45 degrees, or at 60 degrees).

A vapor equalizing connection coupling 510' is optionally in fluid communication with a conduit assembly 1410 (e.g., piping assembly) including a conduit 1416, which optionally extends rearwardly and downwardly from the vessel 1100 to a distal, rearward end which is optionally disposed at least partially lower than the deck 1301, e.g., lower than the upper surface 1309 of the deck. The conduit assembly 1410 optionally extends through the wall 1315 and optionally extends at least partially into the open volume Vo', e.g., with a nozzle thereof positioned at least partially within the open volume Vo'. The vapor equalizing connection coupling and assembly are optionally generally similar to the liquid fill coupling and assembly described in more detail below.

A liquid fill coupling 610' is optionally in fluid (e.g., vapor) communication with a conduit assembly 1420 including a conduit (e.g., pipe) 1426, which optionally extends rearwardly and downwardly from the vessel 1100 to a distal, rearward end which is optionally disposed at least partially lower than the deck 1301, e.g., lower than the upper surface 1309 of the deck. The conduit assembly 1420 optionally extends through the wall 1315 and optionally extends at least partially into the open volume Vo', e.g., with a nozzle thereof positioned at least partially within the open volume Vo'.

Referring to FIG. 13, the liquid fill conduit assembly 1420 is illustrated in dotted lines due to concealment and protection from the right side by the right deck portion 1310-2 (e.g., by an outboard surface 1314-2 thereof). During filling operations, as fluid (e.g., fuel) enters the spray conduit assembly 1420, it optionally passes through a nozzle 1429 coupled (e.g., threaded) to a fill hose (not shown) and selectively secured by a cap 1421 (e.g., a threaded cap). The fluid then optionally passes through a valve 1423 (e.g., on-off valve) which is optionally selectively closed by a controller 1422 (e.g., a handle as illustrated). The fluid then optionally passes through a conduit section 1424 (e.g., pipe section) which optionally passes through an opening (e.g., hole or notch) in the wall 1315. The conduit section 1424 is optionally disposed lower than (e.g., below) the upper surface 1309 of the deck 1301. The fluid then optionally passes through a joint (e.g., an elbow joint such as a 45 degree elbow joint or 60 degree elbow joint) optionally mounted to a forward portion the conduit section 1424. The joint 1425 is optionally disposed forward of the wall 1315 and is optionally disposed lower than (e.g., below) the deck. The fluid then optionally passes through a conduit 1426 which optionally extends forwardly and upwardly from a distal end (which is optionally disposed lower than the upper surface 1309 of the deck) to a proximate end (which is optionally disposed higher than and forward of the upper surface 1309 of the deck). The fluid then optionally passes through a fitting 1427 (e.g., threaded fitting) which optionally joins the conduit 1426 to the liquid fill coupling 610'. The fluid then optionally enters the vessel 1100 via the liquid fill coupling 610'.

The liquid fill coupling 610' may be joined (e.g., welded such as by fillet welding) to an opening provided in the vessel 1100. The liquid fill coupling 610' optionally defines a central axis Ao (e.g., the central axis of an opening provided therethrough or the central axis of an outer circumference thereof) which may be disposed at an obtuse angle relative to a plane Pn defined by the circumference of the opening in to which the coupling 610' is joined. The axis Ao may also be normal to the plane Pn in some embodiments.

Some or all of the cap 1421, nozzle 1429, valve 1423 and controller 1422 are optionally disposed at least partially within the open volume Vo' and are optionally disposed rearward of the wall 1315. Corresponding features of the vapor equalizing conduit assembly 1410 are optionally also housed within the open volume Vo' and are optionally disposed rearward of the wall 1315. It should be appreciated that the operator may access the conduit assemblies and nozzles thereof more easily than if the nozzles were located above and/or rearward of the deck 1301, e.g., generally adjacent to the couplings 510', 610'.

In some exemplary embodiments, the vessel 1100 may be sized to contain a smaller volume (e.g., 3200 gallons) than the vessel 100 and may have a smaller radius (e.g., 40 inches) and/or longer overall length (e.g., 177.25 inches) than the vessel 100. In such embodiments, the vessel 1100 may be formed from a mild steel such as ASME 612 and the shell thereof may have a thickness greater than that of the vessel 100 (e.g., 0.5 inches). In such embodiments, the vehicle 1200 may have a longer wheelbase than that of the vehicle 200 and the rearward annular seam of the vessel 1100 may be disposed forward of the rear axle of the vehicle 1200.

Figure 18:
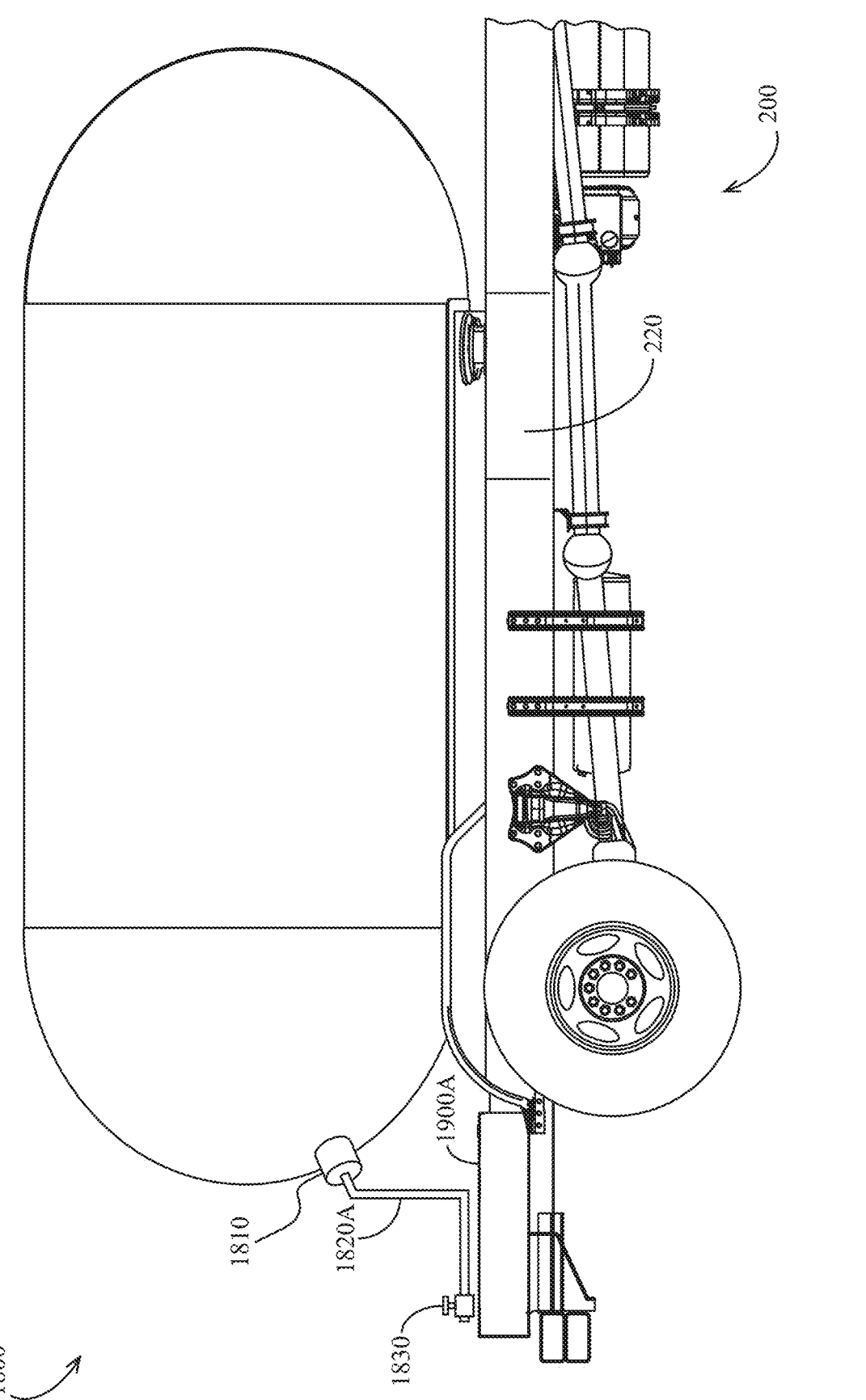
FIG. 18 is a partial side elevation view of another embodiment of a fuel delivery vehicle.
Figure 19:
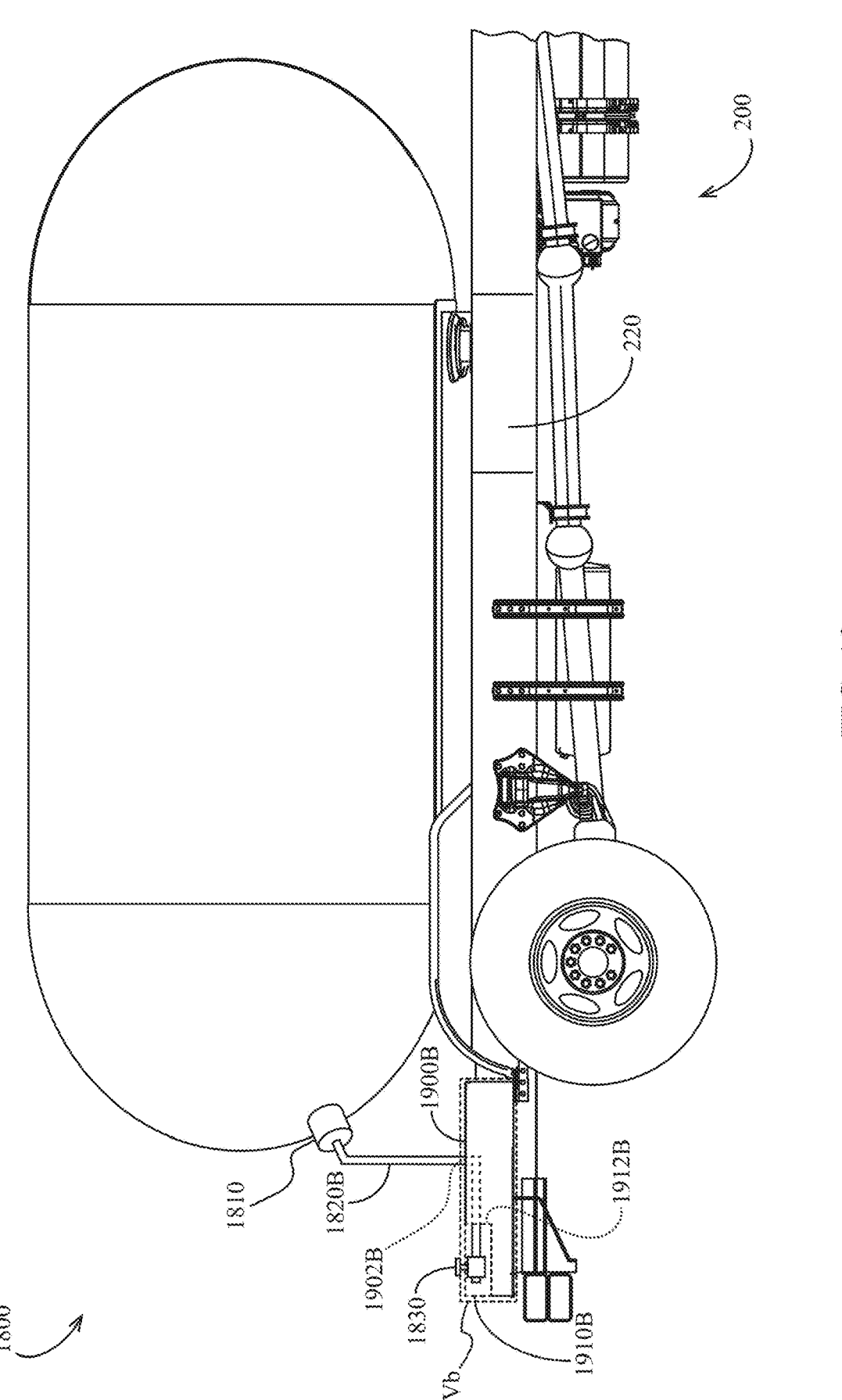
FIG. 19 is a partial side elevation view of another embodiment of a fuel delivery vehicle.
Figure 20:
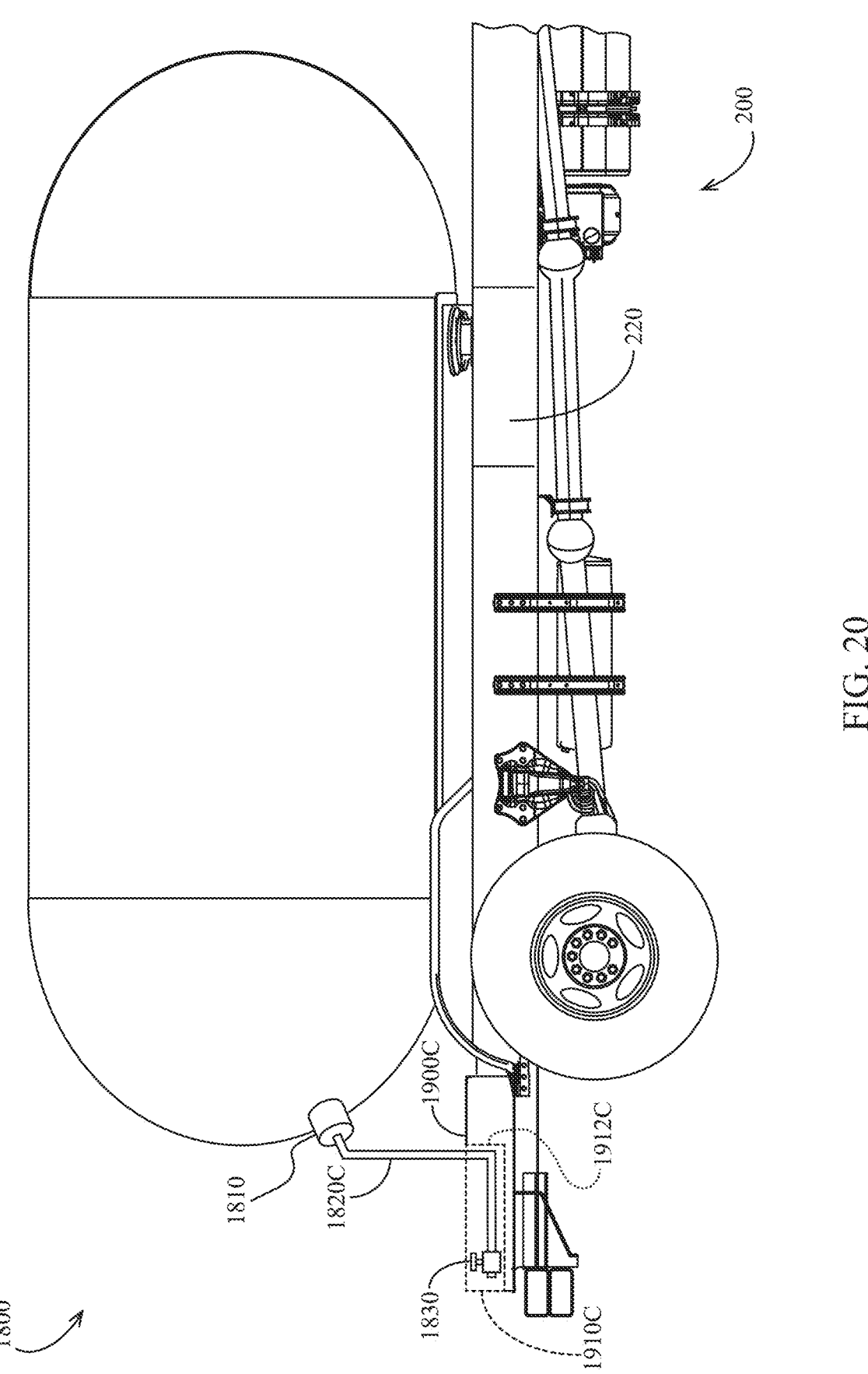
FIG. 20 is a partial side elevation view of another embodiment of a fuel delivery vehicle.

Referring to FIGS. 18-20, various alternative embodiments are illustrated. In each embodiment of FIGS. 18-20, a fluid connection 1810 (e.g., a liquid fill connection such as a conventional propane truck spray fill connection and/or a vapor connection such as a conventional propane truck vapor connection) of a vessel 1800 (e.g., a conventional vessel of a propane delivery vehicle such as a propane bobtail) is fluidly coupled to a nozzle 1830 which is accessible by an operator for connection to an external tank, vehicle or other apparatus.

In the embodiment of FIG. 18, a conduit 1820A (e.g., pipe assembly such as a rigid or flexible pipe assembly) fluidly couples the connection 1810 to the nozzle 1830. The nozzle 1830 is optionally disposed above and/or adjacent to an upper surface of a deck 1900A. The conduit 1820A optionally extends downward to a point above and/or adjacent to the upper surface of deck 1900A. The nozzle 1830 is optionally disposed forward of (e.g., slightly forward of, adjacent to, etc.) a rear end of the deck 1900A. The conduit 1820A optionally extends rearwardly to a point slightly forward of (e.g., slightly forward of, adjacent to, etc.) a rear end of the deck 1900A.

In the embodiment of FIG. 19, a conduit 1820B (e.g., pipe assembly such as a rigid or flexible pipe assembly) fluidly couples the connection 1810 to the nozzle 1830. The nozzle 1830 is optionally disposed at least partially below an upper surface of a deck 1900B. The nozzle 1830 is optionally disposed at least partially within an open volume 1910B of the deck 1900B. The open volume 1910B optionally extends transversely across part or all of the width of the deck 1900B. The open volume 1910B is optionally disposed within a bounding volume Vb (e.g., bounding box, minimum bounding box, minimum bounding volume) of the deck 1900B; for example, a minimum bounding box of the deck may comprise the smallest theoretical rectangular prism that would include the entire deck. The conduit 1820B optionally extends below the upper surface of the deck 1900B (e.g., through an opening 1902B in the deck 1900B as illustrated, or in other embodiments at a point forward of the upper surface of deck 1900B). The conduit 1820B optionally extends through a rear wall 1912B of the deck 1900B; the rear wall 1912B optionally comprises a forward wall of the open volume 1910B. The nozzle 1830 is optionally disposed forward of (e.g., slightly forward of, adjacent to, etc.) a rear end of the deck 1900A.

In the embodiment of FIG. 20, a conduit 1820C (e.g., pipe assembly such as a rigid or flexible pipe assembly) fluidly couples the connection 1810 to the nozzle 1830. The nozzle 1830 is optionally disposed at least partially below an upper surface of a deck 1900C. The conduit 1820C optionally extends into an open volume 1910C of a deck 1900C. The open volume 1910C optionally extends transversely across part or all of the width of the deck 1900C. The conduit 1820C optionally extends into the open volume 1910C forward of a rear wall 1912C of the deck 1900C. The rear wall 1912C optionally comprises a forward wall of the open volume 1910C. The nozzle 1830 is optionally disposed forward of (e.g., slightly forward of, adjacent to, etc.) a rear end of the deck 1900A.

It should be appreciated that certain ergonomic and other benefits which may be provided by some or all of the various conduit assemblies described herein are not necessarily dependent on the vessel sizing, material selection, material processing, material thickness, and fluid connection installations also described herein. It should also be appreciated that in some embodiments the conduit assemblies (e.g., vapor equalizing and liquid fill) may be modified to include unitary conduits and/or flexible conduits such as rubber hoses. Although certain advantageous positioning and installation features are recited with regard to inlet assemblies (e.g., vapor equalizing and liquid fill) herein, the same features may be applied to outlets or other fluid connections on the vessel. It should be appreciated that although certain vessels and vehicles are described as fuel cargo tanks and fuel delivery vehicles herein, the vessels and vehicles described could be used to transport and deliver other fluids in the liquid and/or gas phase. It should also be appreciated that the vessels described herein could be stationary or mounted to a portable frame (e.g., skid) rather than being mounted to a vehicle.

Autogas Delivery System Embodiments

Figure 14:
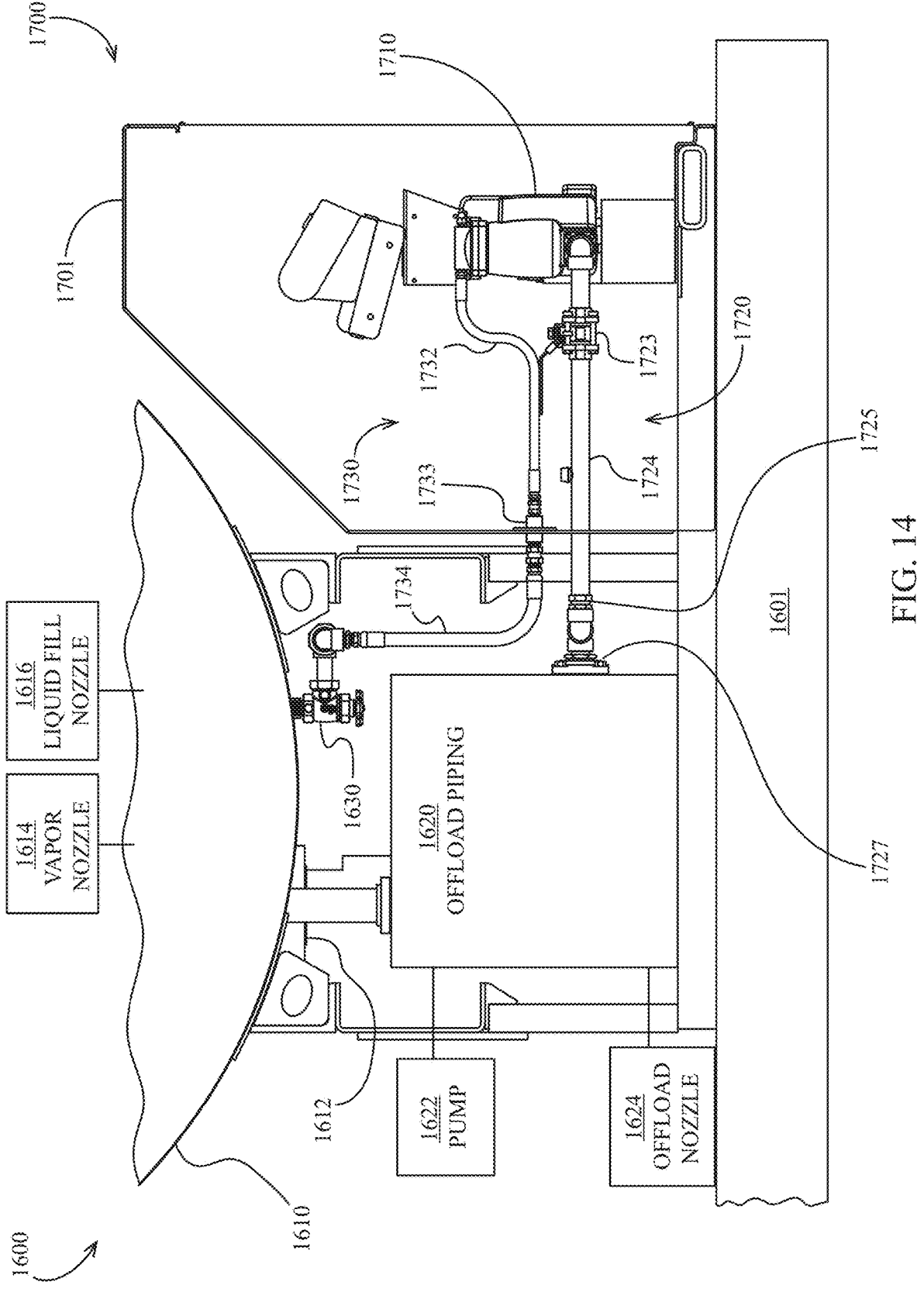
FIG. 14 is a partial rear elevation view of another embodiment of a fuel delivery vehicle having an embodiment of an autogas delivery system.

Referring to FIG. 14, a fluid delivery vehicle 1600 is illustrated having a fuel vessel 1610 (e.g., propane vessel). The fuel vessel 1610 is optionally in fluid communication with an autogas (e.g., liquefied petroleum gas vehicle fuel) delivery system 1700 which is described in more detail according to various embodiments below. The fuel vessel 1610 is optionally in fluid (e.g., vapor) communication with a vapor nozzle 1614 and liquid fill nozzle 1616, which may be conventional nozzles or may have some or all common features with one or more of the liquid fill and vapor nozzle embodiments described elsewhere herein. An outlet 1612 of the vessel 1610 is optionally in fluid communication with an offload nozzle 1624 (e.g., a hose nozzle) via offload piping 1620. The offload piping 1620 optionally comprises conventional propane delivery vehicle piping. A pump 1622 is optionally in fluid communication with the offload piping 1620 for pumping fuel from the vessel 1610 through the offload piping 1620.

Figure 15:
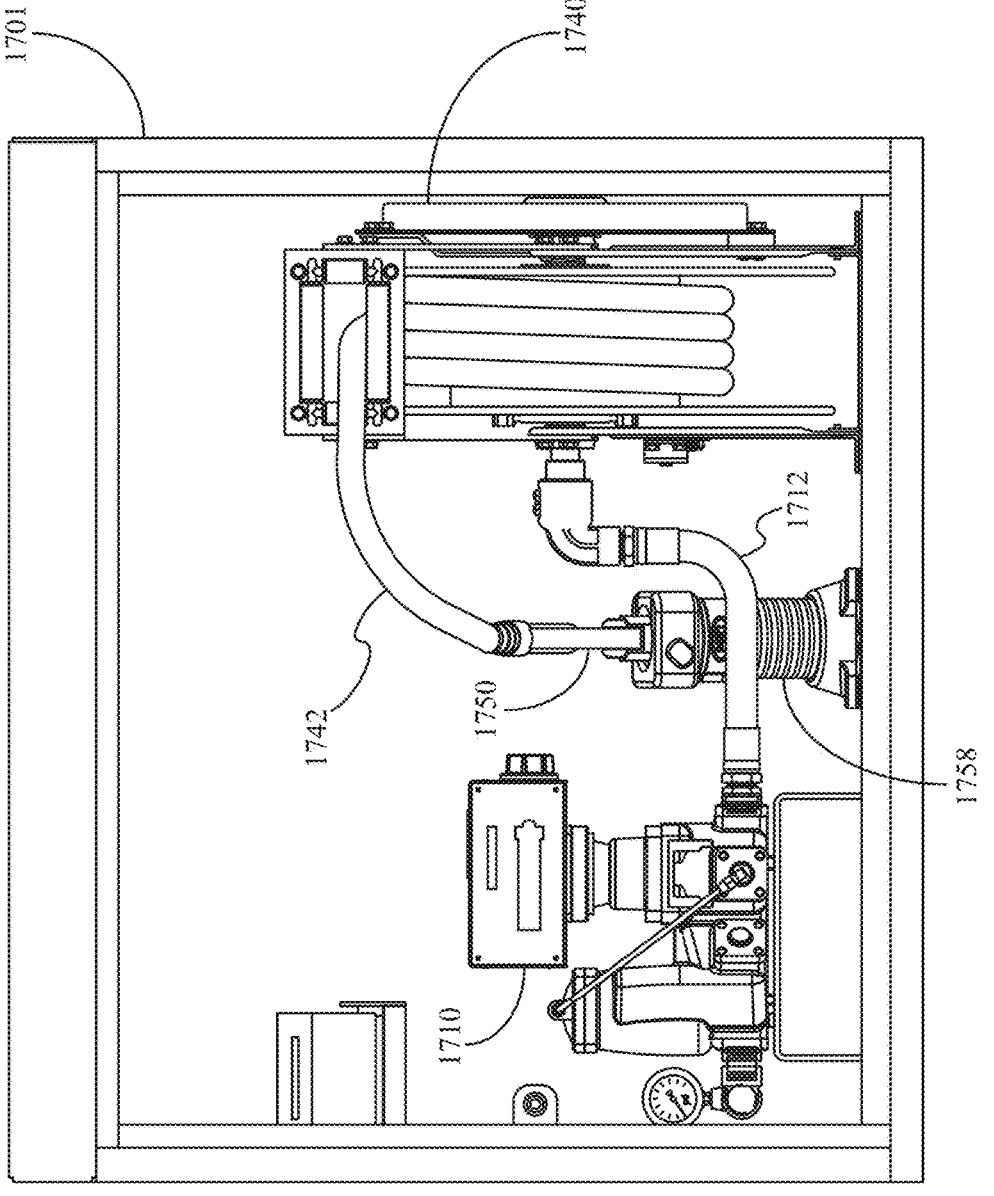
FIG. 15 is a side elevation view of the autogas delivery system of FIG. 14.
Figure 15:
Figure 16:
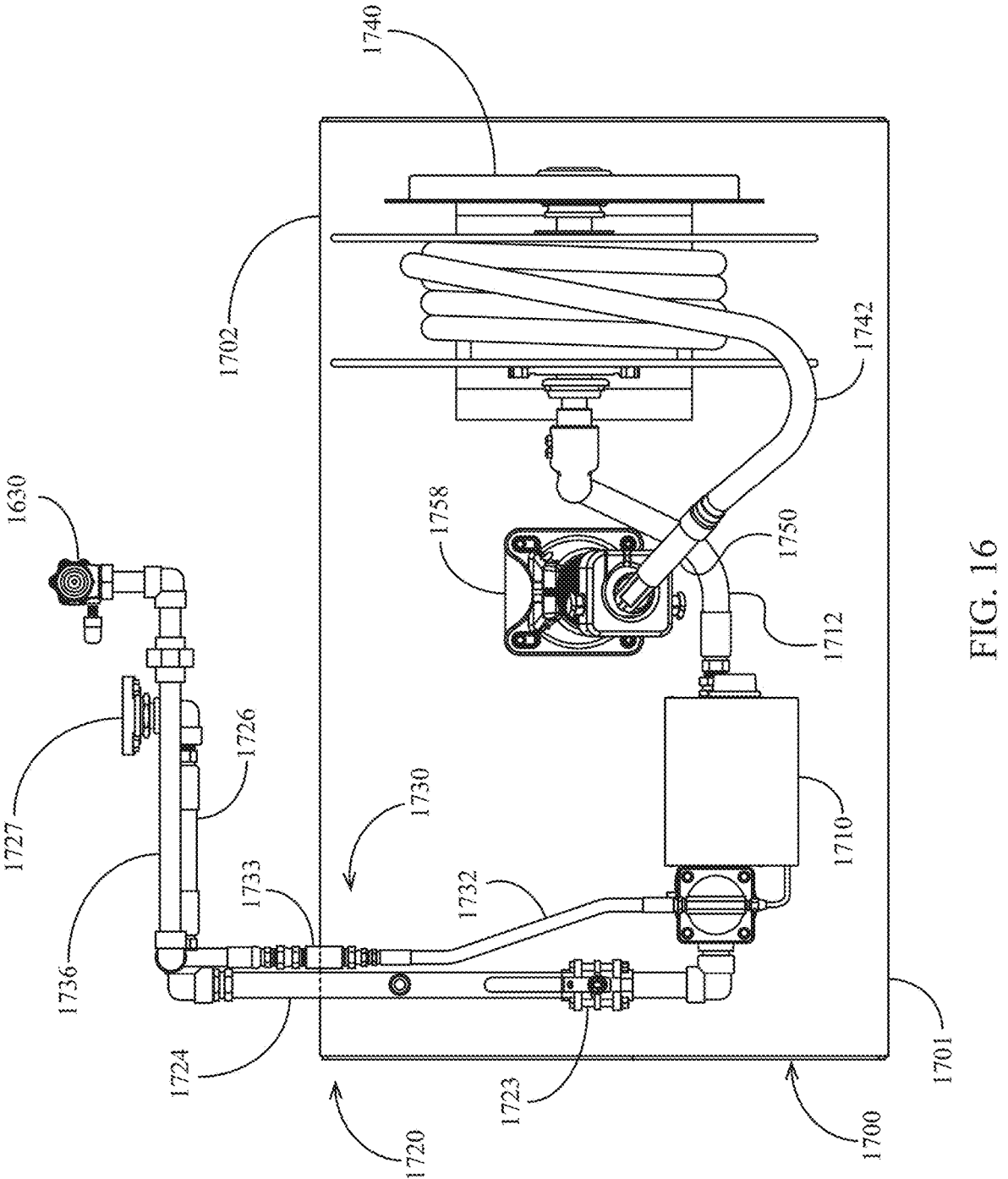
FIG. 16 is a plan view of the autogas delivery system of FIG. 14.

Referring to FIGS. 14-16, the autogas delivery system 1700 is optionally housed in a cabinet 1701, the rearward side of which is not shown in FIG. 14 for clarity and the top of which is not shown in FIG. 16 for clarity. The autogas delivery system 1700 optionally includes a meter 1710 in fluid communication with the vessel 1610. The meter 1710 is optionally in fluid communication with a hose 1742 (e.g., via an intermediate conduit 1712 such a flexible hose). The hose 1742 may be ¾ inch in diameter or other suitable diameter. The hose 1742 is optionally supported on a hose reel 1740. A terminal end of hose 1742 is optionally provided with a nozzle 1750 (e.g., an autogas nozzle). The nozzle 1750 is optionally selectively supported on a holster 1758. The meter 1710 optionally calculates and/or displays the amount of fuel delivered via the nozzle 1750.

The autogas delivery system 1700 optionally includes a pump discharge line 1720 which places the meter 1710 and/or the nozzle 1750 in fluid communication with the offload piping 1620 for delivering fuel to the nozzle 1750. The pump discharge line 1720 optionally includes a valve 1723 (e.g., a ball valve or other shut-off valve). The pump discharge line 1720 optionally includes a pipe 1724 or other conduit extending through an opening in a wall 1702 of the cabinet 1701. The pipe 1724 is optionally in fluid communication with a pipe 1726 which extends generally forwardly in some embodiments. The pipe 1726 is optionally removably coupled to the pipe 1724 by a removable coupling 1725 such as a swivel coupling. The pump discharge line 1720 is optionally fluidly coupled to the offload piping 1620 at a flange 1727 or other coupling. In operation, fuel such as autogas is pumped moves from the vessel 1610 through the offload piping and to autogas delivery system 1700 via the pump discharge line 1720. The pump discharge line 1720 optionally has a smaller pipe diameter than a pipe connecting the vessel 1610 to the offload nozzle 1624. The autogas delivery system 1700 optionally operates at a lower flow rate (and/or optionally at a higher pressure) than the offload nozzle 1624. In some embodiments, an additional bypass system (not shown) which may incorporate a bypass valve (not shown) is employed to maintain a given pressure or pressure range in the autogas delivery system 1700.

The autogas delivery system 1700 optionally includes a vapor line 1730 which places the meter 1710 in fluid (e.g., vapor) communication with a vapor connection 1630 of the vessel 1610. The vapor connection 1630 is optionally selectively closable, e.g. by a valve. The vapor line 1730 optionally includes a conduit 1732 such as a hose or other flexible conduit or a pipe. The conduit 1732 is optionally coupled at a first end to a fluid coupling 1733 (e.g., a bulkhead). The coupling 1733 is optionally supported by and/or optionally extends through the wall 1702 of the cabinet 1701. The meter 1710 is optionally in fluid communication with a conduit 1734 such as a flexible conduit (e.g., via the conduit 1732 and/or coupling 1733). In operation, vapor is optionally exchanged between the autogas delivery system 1700 and the vessel 1610 via the vapor line 1730.

Figure 17:
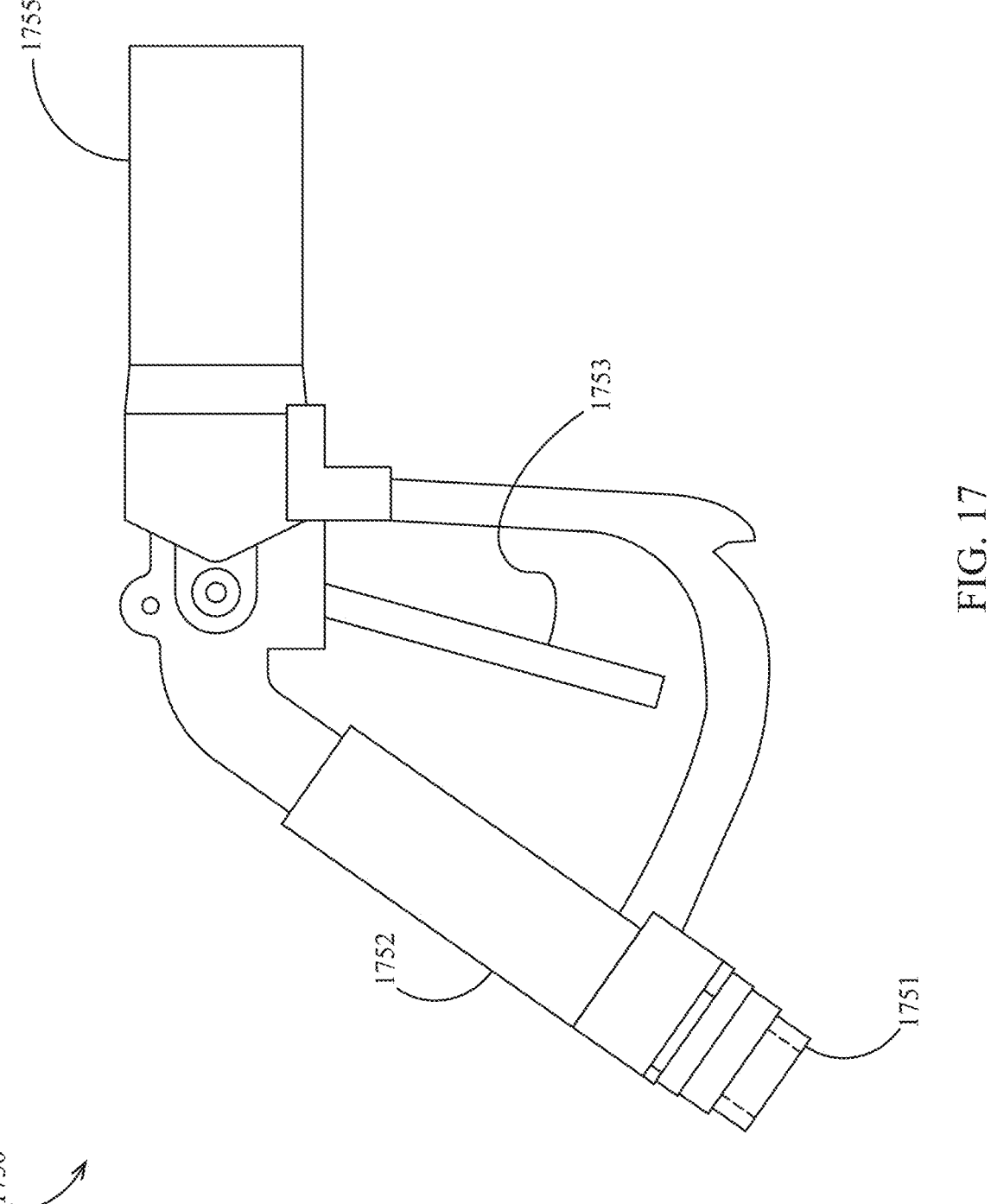
FIG. 17 is a side elevation view of an autogas delivery nozzle.

Turning to FIG. 17, in some embodiments the nozzle 1750 comprises an autogas nozzle. The nozzle 1750 is optionally configured to deliver fuel (e.g., propane-based fuel, liquefied petroleum gas, autogas, etc.) to a vehicle fuel tank. The nozzle 1750 optionally comprises an inlet 1751 in selective fluid communication with an outlet 1755. The nozzle 1750 optionally comprises a handle 1752 configured to be held by an operator. The nozzle 1750 optionally includes a lever 1753 or other user interface selectively movable between an "open" position in which the inlet 1751 is in fluid communication with outlet 1755 and a "closed" position in which the inlet 1751 is not in fluid communication with outlet 1755. For example, the lever 1753 optionally actuates a valve (not shown) when moved between the "open" and "closed" positions. The lever 1753 is optionally disposed to be actuated by an operator using the same hand used to hold the handle 1752. The outlet 1755 optionally includes a coupling (e.g., threaded coupling, claw coupling, etc.) for coupling the nozzle 1750 to a vehicle tank inlet (not shown). The outlet optionally has a "coupled" configuration and an "uncoupled" configuration. The nozzle 1750 is optionally configured to disallow fluid flow therethrough when the outlet 1755 is not in a "coupled" configuration. In some embodiments, the nozzle 1750 comprises a ZVG 2 autogas nozzle (ACME, DISH or EURO style) available from ELA-FLEX HIBY Tanktechnik in Hamburg, Germany. In other embodiments, the nozzle 1750 comprises a GPV14 LPG nozzle available from Staubli in Pfaffikon, Switzerland.

As used herein, references to forward and rearward are generally used in reference to the direction of travel T of the vehicle (e.g., to the right on the view of FIG. 2) unless otherwise indicated by the context of the disclosure.

Dimensions and other values recited herein are provided for illustrative purposes and are not intended to be limiting. Ranges recited herein are likewise illustrative and non-limiting, and are intended to inclusively recite all values within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A fuel delivery vehicle, comprising:
a first longitudinally extending rail;
a second longitudinally extending rail;
a fuel vessel supported by said first rail and said second rail, said first rail and second rail being laterally spaced apart, each of said first rail and second rail having a lower surface disposed at a first height and an upper surface disposed at a second height, said first height being lower than said second height;
a liquid fill connection having a first opening in fluid communication with an interior volume of the fuel vessel;
a rear bumper, a lowermost end of said rear bumper being disposed at a third height, said third height being lower than said first height;
a liquid fill assembly, said liquid fill assembly comprising a valve, said liquid fill assembly comprising a removable cap, said liquid fill assembly comprising a controller adjustable by a user, said liquid fill assembly being disposed at a position that is at least partially below said second height, said liquid fill assembly being disposed at a position that is at least partially above said third height, said liquid fill assembly being disposed at a position that is laterally between said first and second rails; and
a first conduit fluidly coupling said liquid fill assembly to said liquid fill connection, said first conduit extending from said vessel and at least partially between said first and second rails, wherein said liquid fill assembly is supported on a terminal end of said first conduit.

2. The fuel delivery vehicle of claim 1, wherein said liquid fill assembly is disposed at least partially forward of said rear bumper along a travel direction of the vehicle.

3. The fuel delivery vehicle of claim 2, further comprising:
a first sidewall connected to said rear bumper; and
a second sidewall connected to said rear bumper, said liquid fill assembly being disposed laterally between said first and second sidewalls.

4. The fuel delivery vehicle of claim 1, wherein said liquid fill assembly is disposed at least partially between said first height and said second height.

5. The fuel delivery vehicle of claim 1, further comprising: a vertical wall supported laterally between said first and second rails, said first conduit extending through said vertical wall.

6. The fuel delivery vehicle of claim 5, wherein said liquid fill assembly is disposed rearward of said vertical wall.

7. The fuel delivery vehicle of claim 1, further comprising:
a vapor equalizing connection having a second opening in fluid communication with said interior volume of said fuel vessel;
a vapor assembly, said vapor assembly being disposed at least partially below said second height; and
a second conduit, said second conduit fluidly coupled to said vapor assembly and to said vapor equalizing connection.

8. The fuel delivery vehicle of claim 7, wherein said vapor assembly is disposed at least partially above said third height.

9. The fuel delivery vehicle of claim 7, wherein said vapor assembly is disposed laterally between the first rail and the second rail.

10. The fuel delivery vehicle of claim 7, wherein said vapor assembly is disposed at least partially between the first height and the second height.

11. The fuel delivery vehicle of claim 7, wherein said vapor assembly is oriented in a rearward direction.

12. The fuel delivery vehicle of claim 7, wherein said fuel vessel is at least partially made of a high-strength steel, and wherein a shell thickness Ts of said fuel vessel is less than a half inch.

13. The fuel delivery vehicle of claim 7, wherein said liquid fill connection comprises a flange, wherein said flange defines a central axis, wherein said central axis is generally normal to said fuel vessel.

14. The fuel delivery vehicle of claim 1, wherein said first opening is disposed above said first and second rails.

15. The fuel delivery vehicle of claim 1, wherein said liquid fill assembly is disposed entirely forward of rearward ends of said first and second rails.

16. The fuel delivery vehicle of claim 1, wherein said liquid fill assembly comprises a nozzle.

17. The fuel delivery vehicle of claim 1, wherein said conduit is at least partially rigid.

18. The fuel delivery vehicle of claim 1, wherein said conduit at least partially comprises a rigid pipe.

19. The fuel delivery vehicle of claim 1, wherein liquid fill assembly is oriented in a rearward direction.

20. The fuel delivery vehicle of claim 1, wherein said liquid fill assembly is disposed at a position that is at least partially rearward of said fuel vessel.

\* \* \* \* \*